(12) United States Patent
Nagalla et al.

(10) Patent No.: US 10,866,320 B2
(45) Date of Patent: Dec. 15, 2020

(54) REMOTE CONTROL OF A LASER TRACKER USING A MOBILE COMPUTING DEVICE

(71) Applicant: FARO Technologies, Inc., Lake Mary, FL (US)

(72) Inventors: Kalyan Nagalla, Downingtown, PA (US); Yicheng Zhang, West Chester, PA (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 262 days.

(21) Appl. No.: 15/865,675

(22) Filed: Jan. 9, 2018

(65) Prior Publication Data
US 2018/0203120 A1    Jul. 19, 2018

Related U.S. Application Data

(60) Provisional application No. 62/445,931, filed on Jan. 13, 2017.

(51) Int. Cl.
*G01S 17/66* (2006.01)
*G01S 17/42* (2006.01)
(Continued)

(52) U.S. Cl.
CPC ............ *G01S 17/66* (2013.01); *G01C 15/002* (2013.01); *G01S 7/003* (2013.01); *G01S 17/42* (2013.01);
(Continued)

(58) Field of Classification Search
CPC ........... G01S 17/66; G01S 17/87; G01S 7/497
(Continued)

(56) References Cited

U.S. PATENT DOCUMENTS 7,327,446 B2   2/2008  Cramer et al.
7,583,375 B2   9/2009  Cramer et al.
(Continued)

FOREIGN PATENT DOCUMENTS

WO    2014046968 A1    3/2014

OTHER PUBLICATIONS

Mobile operating system from Wikipedia retrieved from Internet: https://en.wikipedia.org/wiki/Mobile_operating_system on Jan. 9, 2018 (18 pgs).
International Search Report and Written Opinion for International Application No. PCT/US2018/013050 dated Mar. 21, 2018; 14 pgs.

*Primary Examiner* — Sunghee Y Gray
(74) *Attorney, Agent, or Firm* — Cantor Colburn LLP

(57) ABSTRACT

A laser tracker system and method of operating the laser tracker system is provided. The laser tracker system includes a laser tracker device and a mobile computing device, each coupled for communication to a computer network. The mobile computing device includes processors that are responsive to computer instructions to perform a method. The method includes identifying the laser tracker device on the computer network. Selecting the first laser tracker device. Connecting to the laser tracker device to transmit signals therebetween via the computer network in response to an input from a user. Then causing the laser tracker device to perform one or more control functions in response to one or more second inputs from the user, wherein at least one of the one or more control functions includes selecting with the mobile computing device a retroreflective target and locking a light beam on the retroreflective target.

16 Claims, 19 Drawing Sheets

(51) Int. Cl.
*H04N 7/18* (2006.01)
*G01C 15/00* (2006.01)
*G01S 7/00* (2006.01)
*G01T 7/00* (2006.01)
*G01S 17/86* (2020.01)
*G06F 3/041* (2006.01)
*G01B 11/00* (2006.01)

(52) U.S. Cl.
CPC ............... *G01S 17/86* (2020.01); *G01T 7/00* (2013.01); *H04N 7/185* (2013.01); *G01B 11/002* (2013.01); *G06F 3/0416* (2013.01)

(58) Field of Classification Search
USPC .................................................. 356/614–624
See application file for complete search history.

(56) References Cited

U.S. PATENT DOCUMENTS

| | | |
|---|---|---|
| 8,537,376 B2 | 9/2013 | Brown et al. |
| 8,558,992 B2 | 10/2013 | Steffey |
| 8,654,354 B2 | 2/2014 | Steffensen et al. |
| 8,724,120 B2 | 5/2014 | Steffey et al. |
| 9,234,742 B2 | 1/2016 | Bridges et al. |
| 9,383,189 B2 | 7/2016 | Bridges et al. |
| 2012/0265479 A1* | 10/2012 | Bridges ................ G01S 7/4813 702/135 |
| 2013/0229512 A1* | 9/2013 | Steffey ................. G01B 11/14 348/135 |
| 2015/0330766 A1 | 11/2015 | Gong |

\* cited by examiner

REMOTE CONTROL OF A LASER TRACKER USING A MOBILE COMPUTING DEVICE

CROSS-REFERENCE TO RELATED APPLICATIONS

The present application is a nonprovisional application of U.S. Provisional Application Ser. No. 62/445,931 filed on Jan. 13, 2017, the contents of which are incorporated herein in their entirety.

BACKGROUND

The subject matter disclosed herein relates to a laser tracker system, and in particular to a laser tracker system that includes a mobile computing device that allows remote operation of the laser tracker.

One set of coordinate measurement devices belongs to a class of instruments that measure the coordinates of a point by sending a beam of light to the point. The beam of light may impinge directly on the point or may impinge on a retroreflector target that is in contact with the point. In either case, the instrument determines the coordinates of the point by measuring a distance and two angles to the target. The distance is measured with a distance-measuring device such as an absolute distance meter or an interferometer. The angles are measured with an angle-measuring device such as an angular encoder. In some embodiments, a gimbaled beam-steering mechanism within the instrument directs the beam of light to the point of interest. Some laser trackers have the ability to track the retroreflector target with one or more emitted beams of light. Other laser trackers may lack the ability to track a rapidly moving retroreflector but still have the ability to lock onto the retroreflector target when the target is stationary or moving slowly. The beam of light emitted by a laser tracker need not be laser light but may be any type of coherent, partially coherent, or incoherent light, including light emitted by a light emitting diode (LED) or a superluminescent diode.

Laser trackers are used in a variety of applications due to their ability measure coordinates over long distances (50-160 meters) with a high degree of accuracy (up to 0.015 millimeters). Further, in some applications, a given facility may have multiple laser trackers arranged to measure coordinates. As a result, personnel may have to expend extra time travelling to or between the laser trackers to initiate operation, measure coordinates, and check accuracy.

Accordingly, while existing laser tracker devices are suitable for their intended purposes the need for improvement remains, particularly in providing a laser tracking system that allows an operator to easily remotely access and control the functionality of a laser tracker.

BRIEF DESCRIPTION

According to one aspect of the disclosure, a laser tracker system is provided. The laser tracker system includes at least one laser tracker device coupled for communication to a computer network. The at least one laser tracker device includes a structure rotatable about a first axis and a second axis, a first light source that launches a first light beam from the structure, a distance meter, a first angular encoder that measures a first angle of rotation about the first axis, a second angular encoder that measures a second angle of rotation about the second axis, and one or more first processors. The at least one laser tracker device further including at least one camera positioned and oriented to acquire an image in the direction of the first light beam. The laser tracker system also includes a mobile computing device coupled for communication to the computer network. The mobile computing device having one or more second processors that are responsive to executable computer instructions, the executable computer instructions when executed on the one or more second processors perform a method. The method includes identifying the at least one laser tracker device on the computer network, the at least one laser tracker device including a first laser tracker device; selecting the first laser tracker device; connecting to the first laser tracker device to transmit signals therebetween via the computer network in response to a first input from a user; and causing the first laser tracker device to perform one or more control functions in response to one or more second inputs from the user, wherein at least one of the one or more control functions includes selecting with the mobile computing device a retroreflective target and locking the first light beam on the retroreflective target.

According to another aspect of the disclosure a method of operating a laser tracker system is provided. The method comprises providing at least one laser tracker device coupled for communication to a computer network, the at least one laser tracker device having a structure rotatable about a first axis and a second axis, a first light source that launches a first light beam from the structure, a distance meter, a first angular encoder that measures a first angle of rotation about the first axis, a second angular encoder that measures a second angle of rotation about the second axis, and one or more first processor, the at least one laser tracker device further including at least one camera positioned and oriented to acquire an image in a direction of the first light beam. A mobile computing device is provided coupled for communication to the computer network, the mobile computing device. The at least one laser tracker device is identified on the computer network, the at least one laser tracker device including a first laser tracker device. The mobile computing device connects to the first laser tracker device to transmit signals therebetween via the computer network in response to a first input from a user. One or more control functions are performed on the first laser tracker device in response to one or more second inputs from the user, wherein at least one of the one or more control functions includes selecting with the mobile computing device a retroreflective target and locking the first light beam on the retroreflective target.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION

Embodiments of the present invention provide advantages in allowing a user to operate a laser tracker device with a mobile computing device, such as a cellular phone or a computer tablet for example. Embodiments of the present invention provide advantages in allowing the user to find laser tracker devices connected to a computer network with the mobile computing device and select a laser tracker to operate. Still further embodiments of the present invention provide advantages in allowing the user to view an image acquired by a camera on the laser tracker device and change the orientation of the laser tracker based on user input such as moving or swiping a finger across a display of the mobile computing device or changing the orientation of the mobile computing device. Further embodiments of the present invention provide advantages in automatically identifying retroreflective targets on the mobile computing device display. Still further embodiments of the present invention provide advantages in allowing the user to select and have the laser tracker device lock onto a retroreflective target by touching the image of the retroreflective target on the display of the mobile computing device. Yet still further embodiments of the present invention provide advantages in allowing a user to determine an angular accuracy of the laser tracker device with the mobile computing device and perform a compensation procedure with the mobile computing device.

Figure 1:
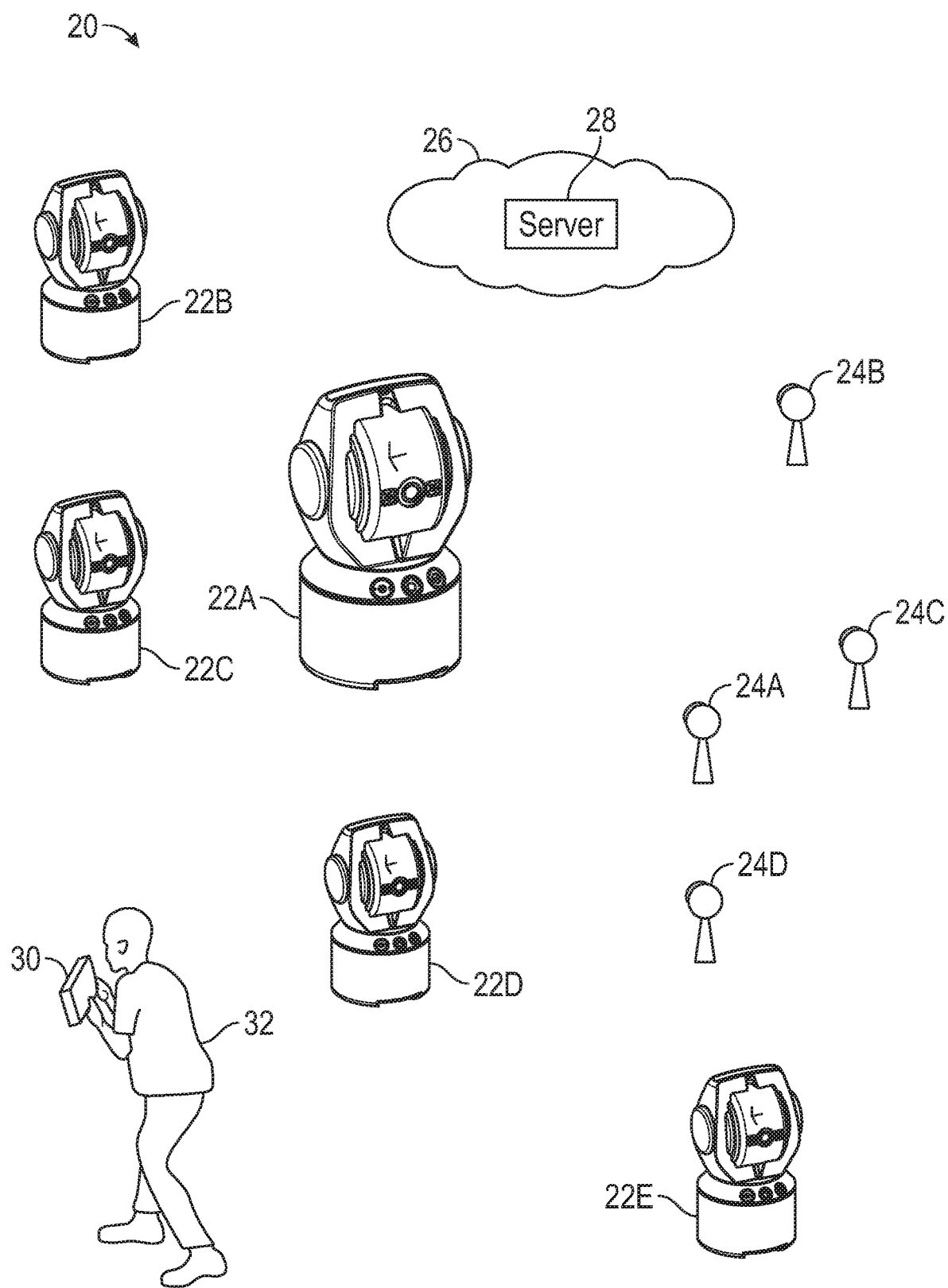
FIG. 1 is an illustration of a laser tracker system in accordance with one or more embodiments of the invention.

A laser tracker device is a metrology device that measures positional coordinates using laser light. Laser tracker devices of the type discussed herein may be used in manufacturing environments where it is desired to measure objects, parts, or assemblies with a high level of accuracy. It should be appreciated in some applications, multiple laser tracker devices may be used and may be positioned in locations that are distant from an operator. An exemplary embodiment a laser tracker system 20 is provided that allows an operator or user to control and operate the functions of a desired laser tracker device is illustrated in FIG. 1.

The laser tracker system 20 includes at least one laser tracker device 22A, and may include a plurality of laser tracker devices 22B-22E. The system 20 further includes at least one retroreflective target 24A, and may include a plurality of retroreflective targets 24B-24D. As will be discussed in more detail herein, the retroreflective targets 24A-24D cooperate with laser light emitted by the laser tracker devices 22A-22E to allow a laser tracker device to measure the distance between the laser tracker device and the retroreflective target. With the distance to the retroreflective device determined, angular measurement devices, such as angular encoders for example, in the laser tracker device allow for the determination of the coordinates of the retroreflective device in a laser tracker device frame of reference.

The system 20 further includes a computer network 26 that may include one or more nodes 28, such as a computer server for example. The computer network 26 may be any known computer network, such as but not limited to a local area network (LAN), a wide-area network (WAN), a cellular network or the Internet for example. In an embodiment, each of the laser tracker devices includes communications circuits, such as Ethernet (IEEE 802.3), WiFi (IEEE 802.11) or cellular communications circuits for example, that are configured to transmit to and receive signals from the computer network 26. The system 20 further includes at least one mobile computing device 30. As will be discussed in more detail herein, the mobile computing device 30 includes communications circuits that allow the mobile computing device 30 to transmit to and receive signals from the computer network. As will be discussed in more detail herein, the computer network 26 allows the mobile computing device 30 to transmit signals to and receive signals from one or more of the laser tracker devices 22A-22E.

As used herein, the term "mobile computing device" refers to a computing device having one or more processors, a display, and non-transitory memory that includes computer readable instructions. The mobile computing device also includes a power source, such as a battery for example, that allows the user 32 to move about the environment with the mobile computing device. The mobile computing device is sized and shaped to be carried by a single person. In an embodiment, the mobile computing device may be but is not limited to a cellular phone, a smartphone, a personal digital assistant, a tablet computer, a laptop computer or a convertible laptop computer for example.

Figure 2:
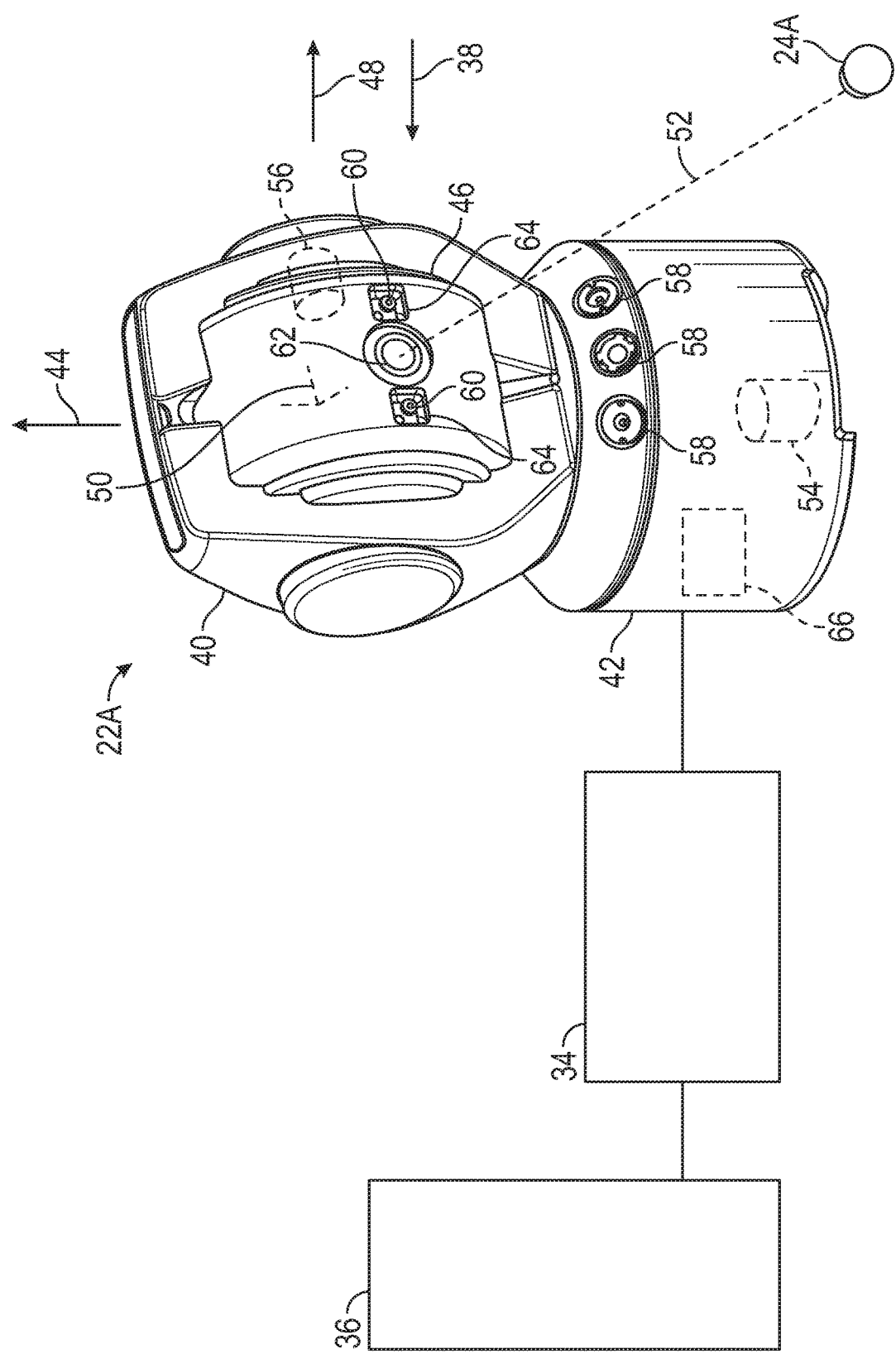
FIG. 2 is an illustration of a laser tracker device for use with the laser tracker system of FIG. 1.
Figure 3:
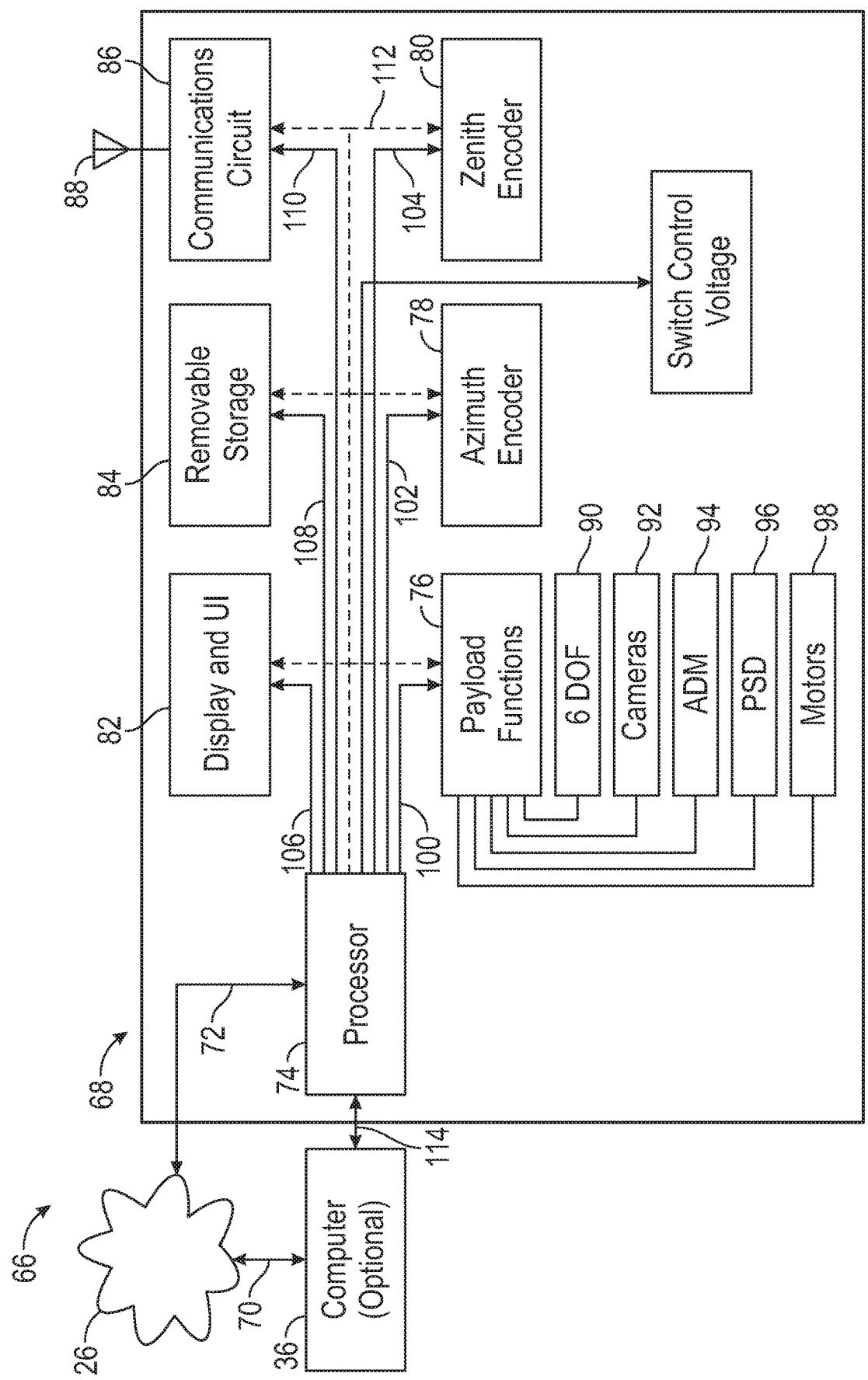
FIG. 3 is a block diagram of a control system of the laser tracker device of FIG. 2.
Figure 4:
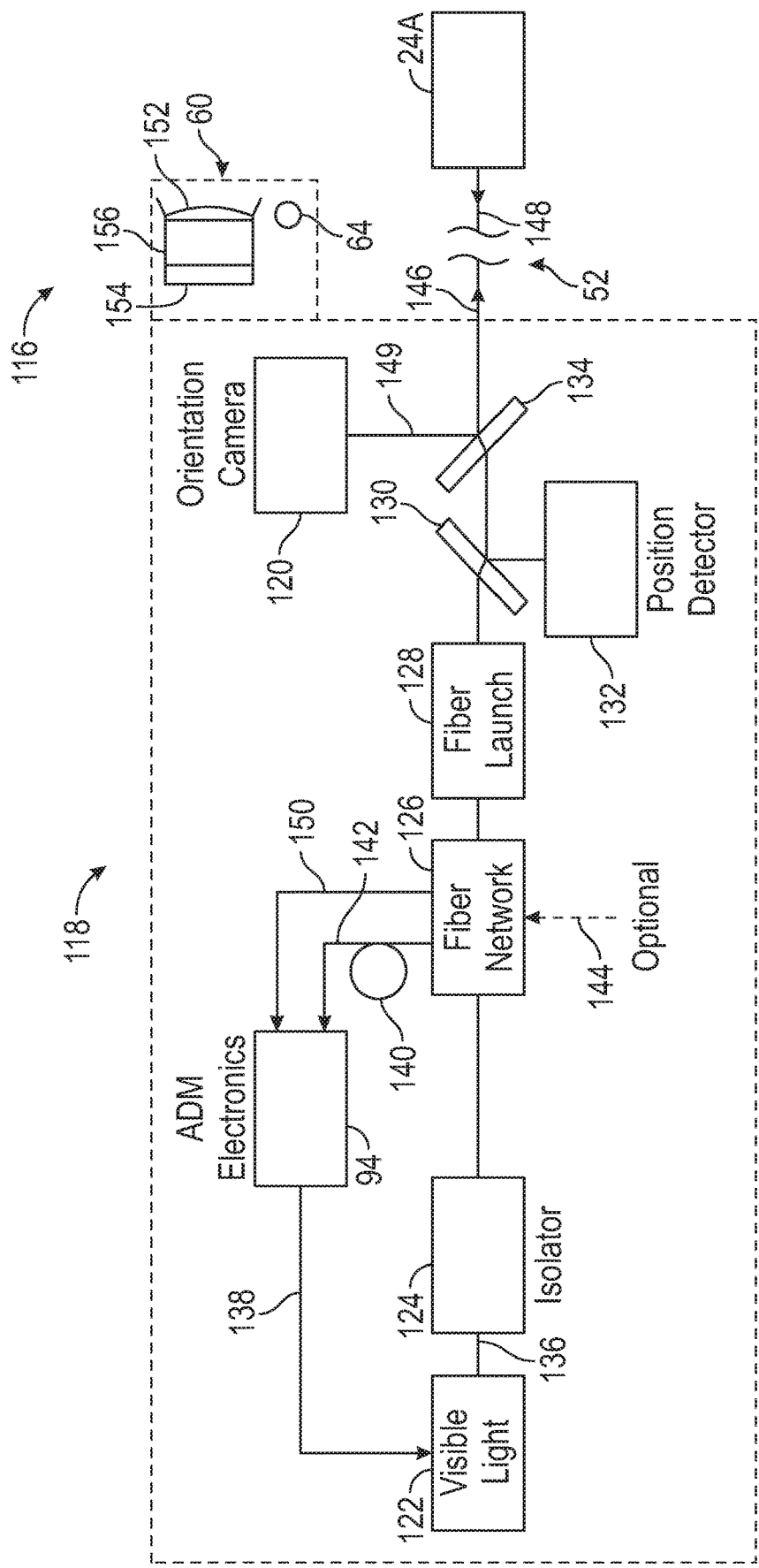
FIG. 4 is a block diagram of elements in a laser tracker device in accordance with one or more embodiments of the invention.

Referring now to FIGS. 2-4, an embodiment of the laser tracker device 22A will be described. In some embodiments, one or more of the laser tracker devices 22A-22E may be constructed in a manner similar to those described in commonly owned U.S. Pat. Nos. 8,558,992, 8,537,376, 8,724,120, and 7,583,375, the contents of which are incorporated by reference herein. In an embodiment, the laser tracker device 22A includes an optional auxiliary unit processor 34, and an optional auxiliary computer 36. In an embodiment, one or both of the auxiliary unit processor 34 or the auxiliary computer 36 may be a node, such as node 28 for example, on the computer network 26. An exemplary gimbaled beam-steering mechanism 38 of laser tracker device 22A comprises a zenith carriage 40 mounted on an azimuth base 42 and rotated about an azimuth axis 44. A payload 46 is mounted on the zenith carriage 40 and rotated about a zenith axis 48. Zenith axis 48 and azimuth axis 44 intersect orthogonally, internally to laser tracker device 22A, at gimbal point 50, which is typically the origin for distance measurements. A light beam 52 virtually passes through the gimbal point 50 and is pointed orthogonal to zenith axis 48. In other words, laser beam 52 lies in a plane approximately perpendicular to the zenith axis 48 and that passes through the azimuth axis 44. Outgoing laser beam 52 is pointed in the desired direction by rotation of payload 46 about zenith axis 48 and by rotation of zenith carriage 40 about azimuth axis 44.

In an embodiment, the payload 46 is rotated about the azimuth axis 44 and zenith axis 48 by motors 54, 56 respectively. The motors 54, 56 may be located internal to the laser tracker device 22A and are aligned with the mechanical axes 44, 48. A zenith angular encoder, internal to the laser tracker device 22A, is attached to a zenith mechanical axis aligned to the zenith axis 48. An azimuth angular encoder, internal to the tracker, is attached to an azimuth mechanical axis aligned to the azimuth axis 44. The zenith and azimuth angular encoders measure the zenith and azimuth angles of rotation to relatively high accuracy. Outgoing laser beam 52 travels to a retroreflector target, such as retroreflective target 24A for example. In an embodiment, the retroreflective target may be a spherically mounted retroreflector (SMR) for example. By measuring the radial distance between gimbal point 50 and retroreflective target 24A, the rotation angle about the zenith axis 48, and the rotation angle about the azimuth axis 44, the position of retroreflective target 24A may be found within the spherical coordinate system of the laser tracker device 22A.

Outgoing light beam 52 may include one or more wavelengths. For the sake of clarity and simplicity, a steering mechanism of the sort shown in FIG. 2 is assumed in the following discussion. However, other types of steering mechanisms are possible. For example, it is possible to reflect a laser beam off a mirror rotated about the azimuth and zenith axes. The techniques described herein are applicable, regardless of the type of steering mechanism.

Magnetic nests 58 may be included on the laser tracker for resetting the laser tracker to a "home" position for different sized SMRs—for example, 1.5, ⅞, and ½ inch SMRs. In addition, an on-tracker mirror, not visible from the view of FIG. 2, may be used in combination with the on-tracker retroreflector to enable performance of a self-compensation.

As will be discussed in more detail herein, one or more target cameras 60 may be disposed on the payload 46 adjacent the aperture 62 from which the light beam 52 is emitted. In an embodiment, the cameras 60 enable the user to view the environment in the direction of the laser tracker device 22A via the display on the mobile computing device 30. In an embodiment, the laser tracker device 22A may also have one or more light sources 64 located on the payload 46 adjacent the cameras 60. As will be discussed in more detail herein, the light sources 64 may be selectively activated on a periodic or aperiodic basis to emit light into the environment to assist in the identification of retroreflective targets 24A-24D.

FIG. 3 is a block diagram depicting a dimensional measurement electronics processing system 66 that includes a laser tracker electronics processing system 68 and computer 36. The processing system 68 may be connected to the computer network 26 via computer 36 and communications medium 70 or directly via a communications medium 72. Exemplary laser tracker electronics processing system 68 includes one or more processors 74, payload functions electronics 76, azimuth encoder electronics 78, zenith encoder electronics 80, display and user interface (UI) electronics 82, removable storage hardware 84, communications circuit 86 electronics, and in an embodiment an antenna 88. The payload functions electronics 76 includes a number of subfunctions including the six-DOF electronics 90, the camera electronics 92, the absolute distance meter (ADM) electronics 94, the position detector (PSD) electronics 96, and motor controller electronics 98. Most of the subfunctions have at least one processor unit, which might be a digital signal processor (DSP) or field programmable gate array (FPGA), for example. In an embodiment, the payload functions 76 are located in the payload 46. In some embodiments, the azimuth encoder electronics 78 are located in the azimuth assembly and the zenith encoder electronics 80 are located in the zenith assembly.

As used herein, when a reference is made to one or more processors of the laser tracker device 22A, it is meant to include possible external computer and cloud support.

In an embodiment, a separate communications bus goes from the processor 74 to each of the electronics units 76, 78, 80, 82, 84, and 86. Each communications line may have, for example, three serial lines that include the data line, clock line, and frame line. The frame line indicates whether or not the electronics unit should pay attention to the clock line. If it indicates that attention should be given, the electronics unit reads the current value of the data line at each clock signal. The clock-signal may correspond, for example, to a rising edge of a clock pulse. In an embodiment, information is transmitted over the data line in the form of a packet. In an embodiment, each packet includes an address, a numeric value, a data message, and a checksum. The address indicates where, within the electronics unit, the data message is to be directed. The location may, for example, correspond to a processor subroutine within the electronics unit. The numeric value indicates the length of the data message. The data message contains data or instructions for the electronics unit to carry out. The checksum is a numeric value that is used to minimize the chance that errors are transmitted over the communications line.

In an embodiment, the processor 74 sends packets of information over bus 100 to payload functions electronics 76, over bus 102 to azimuth encoder electronics 78, over bus 104 to zenith encoder electronics 80, over bus 106 to display and UI electronics 82, over bus 108 to removable storage hardware 84, and over bus 110 to communications circuit 86.

In an embodiment, processor 74 also sends a synch (synchronization) pulse over the synch bus 112 to each of the electronics units at the same time. The synch pulse provides a way of synchronizing values collected by the measurement functions of the laser tracker. For example, the azimuth encoder electronics 78 and the zenith electronics 80 latch their encoder values as soon as the synch pulse is received. Similarly, the payload functions electronics 76 latch the data collected by the electronics contained within the payload. The six-DOF, ADM, and position detector all latch data when the synch pulse is given. In most cases, the camera and inclinometer collect data at a slower rate than the synch pulse rate but may latch data at multiples of the synch pulse period.

In an embodiment, the azimuth encoder electronics 78 and zenith encoder electronics 80 are separated from one another and from the payload functions 76 by slip rings, which are electromechanical devices that allow the transmission of electrical power and electrical signals from a stationary to a rotating structure, and vice versa. For this reason, the bus lines 100, 102, and 104 are depicted as separate bus lines.

The laser tracker electronics processing system 68 may communicate with an external computer 36, or it may provide computation, display, and UI functions within the laser tracker. The laser tracker communicates with computer 36 over communications link 114, which might be, for example, an Ethernet line or a wireless connection. The laser tracker may also communicate with other elements such as node 28, via computer network 26, through communications medium 72, which might include one or more electrical cables, such as Ethernet cables, and one or more wireless connections. It should be appreciated that while FIG. 3 illustrates the communications medium 72 as extending from the computer network 26 directly to the processor 74, signals may be transmitted and received via the communications circuit 86. As discussed in more detail herein, a user having the mobile computing device 30 may have a connection to the computer network 26 over an Ethernet or wireless communications medium, which in turn connects to the processor 74 over an Ethernet or wireless communications medium. In this way, a user may control the functions of a remote laser tracker.

In an embodiment, a laser tracker may use one visible wavelength (usually red) and one infrared wavelength for the ADM. The red wavelength may be provided by a frequency stabilized helium-neon (HeNe) laser suitable for use in an interferometer and also for use in providing a red pointer beam. In other embodiments, the red wavelength may be provided by a diode laser that serves just as a pointer beam. In another embodiment, a laser tracker uses a single visible wavelength (for example, red) for both the ADM and the pointer beam.

FIG. 4 shows an embodiment of a laser tracker device having a target camera system 116 and an optoelectronic system 118 in which an optional orientation camera 120 is combined with the optoelectronic functionality of a 3D laser tracker to measure the distance to the retroreflective target 24A. In an embodiment, the optoelectronic system 118 includes a visible light source 122, an isolator 124, ADM electronics 94, a fiber network 126, a fiber launch 128, a beam splitter 130, a position detector 132, a beam splitter 134, and an optional orientation camera 120. The light from the visible light source 122 is emitted in optical fiber 136 and travels through isolator 124, which may have optical fibers coupled on the input and output ports. The ADM electronics 94 sends an electrical signal over connection 138 to modulate the visible light source 122. Some of the light entering the fiber network travels through the fiber length equalizer 140 and the optical fiber 142 to enter the reference channel of the ADM electronics 94. An electrical signal 144 may optionally be applied to the fiber network 126 to provide a switching signal to a fiber optic switch within the fiber network 126. A part of the light travels from the fiber network to the fiber launch 128, which sends the light on the optical fiber into free space as light beam 146. A small amount of the light reflects off the beam splitter 130 and is lost. A portion of the light passes through the beam splitter 130, through the beam splitter 134, and travels out of the tracker to retroreflective target 24A.

On its return path, the light 148 from the retroreflective target 24A enters the optoelectronic system 118 and arrives at beam splitter 134. Part of the light is reflected off the beam splitter 134 and enters the optional orientation camera 120. The optional orientation camera 120 records an image of the light 149, which is evaluated by a processor to determine three orientational degrees-of-freedom of the retroreflector target 24A. A portion of the light at beam splitter 130 travels through the beam splitter and is put onto an optical fiber by the fiber launch 128. The light travels to fiber network 126. Part of this light travels to optical fiber 150, from which it enters the measure channel of the ADM electronics 94.

The target camera system 116 includes one or more cameras 60, each having one or more light sources 64. The target camera system 116 is also shown in FIG. 2. The camera 60 includes a lens system 152, a photosensitive array 154, and a body 156. One use of the target camera system 116 is to locate retroreflector targets in the work volume. In an embodiment, each target camera does this by flashing the light source 64, which the camera 60 picks up as a bright spot on the photosensitive array 154. As will be discussed in more detail herein, the system 20 is configured to determine and identify retroreflective targets based on the light from light source 64. The system 20 is further configured to evaluate the images captured by the cameras 60 to distinguish light reflected by the retroreflective targets from other sources of light. Further, the image acquired by camera 60 may also be transmitted to the mobile computing device where the user may interact with the laser tracker device, such as by reorienting the position of the payload using the image. It should be appreciated that while embodiments herein may refer to "an image", this is for exemplary purposes and the claims should not be so narrowly construed as to require a single image. In some embodiments, the camera 60 acquires a video image (e.g. 30 frames per second).

It should be appreciated that the optoelectronic system 118 illustrated in FIG. 4 is exemplary and not intended to be limiting. In other embodiments, the optoelectronic system may include additional or fewer components. For example, in some embodiments, the optoelectronic system may include an interferometer for example. The interferometer may be in place of the ADM 94 or used in combination with the ADM 94. In other embodiments, the optoelectronic system 118 may not include the orientation camera 120.

Figure 5:
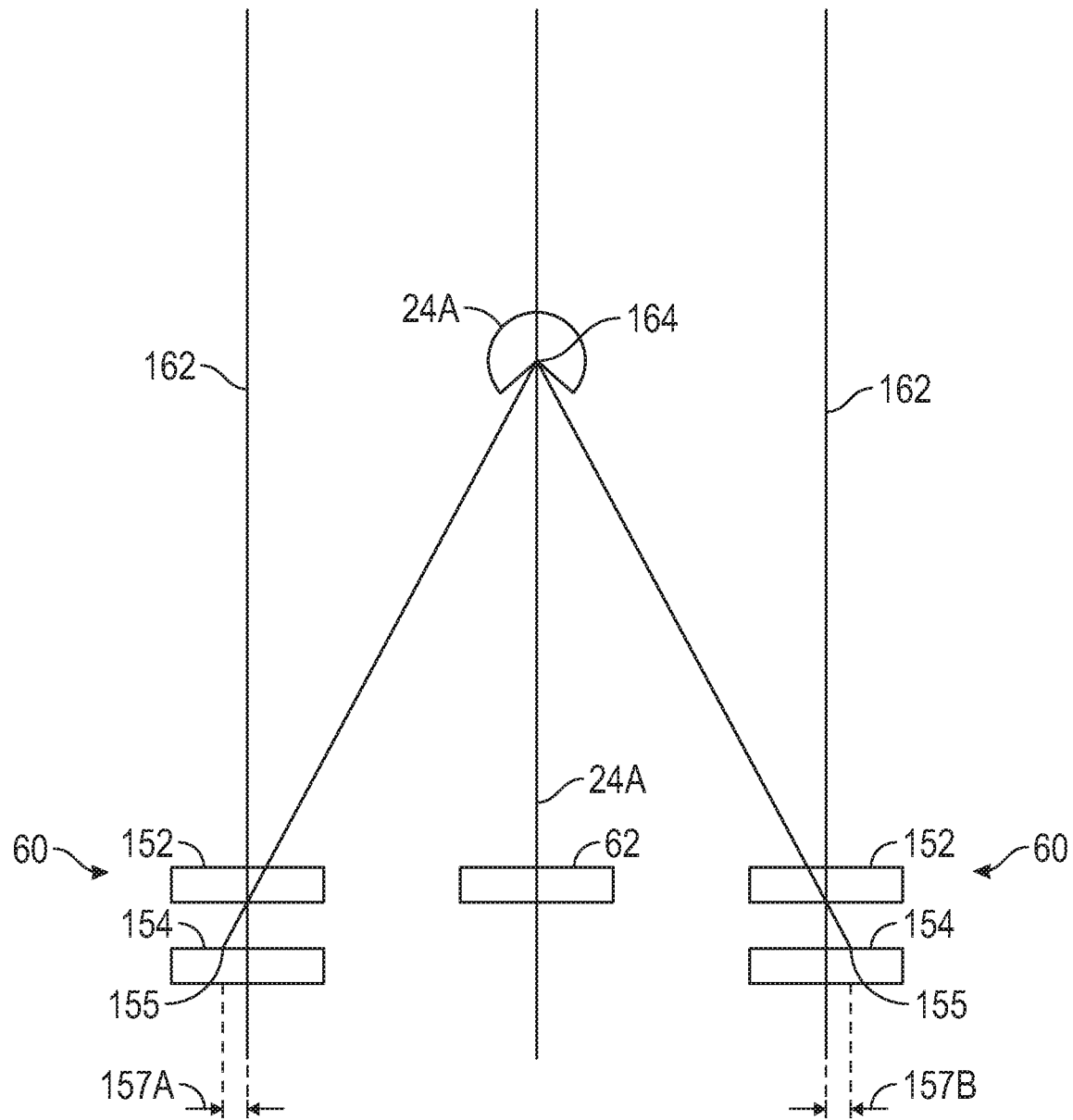
FIG. 5 is a schematic illustration of camera elements of a laser tracker device and a retroreflective target in accordance with one or more embodiments of the invention.

Referring now to FIG. 5, an embodiment is shown that illustrates how a pair of cameras 60 are calibrated and compensated to allow the control of the laser tracker device 22A with the mobile computing device 30. In an embodiment, when the laser tracker device 22A is manufactured, each of the two cameras 60 is positioned substantially equidistant from the optical axis 160 of the laser tracker device 22A, and each camera 60 is aligned to place its optical axis 162 parallel to the optical axis 160 of the laser tracker device 22A. After the laser tracker device 22A has been assembled, a compensation procedure is carried out to determine two compensation parameters that are used to direct the beam to a point selected by a user, such as on an image displayed on the mobile computing device 30. The two compensation parameters are the "tracking center" and the "scale factor." These parameters are determined by performing a compensation procedure in which each camera 60 captures images of a retroreflective target 24A illuminated by the flashing lights 64 adjacent to the target camera 60. In an embodiment, this compensation procedure is performed with an SMR type retroreflective target at a predetermined distance, such as 15 meters for example.

The tracker-center parameter includes two values—a tracking-center horizontal pixel value and a tracking-center vertical pixel value. With the tracker light beam 52 aimed directly at the retroreflector target 24A, the lights 64 are flashed to obtain a flashing-spot image 155 on left and right target cameras 60. The tracking-center horizontal pixel value and the tracking-center vertical pixel value are found by taking the average of the pixel readings of the flashing spot 155 on the left and right cameras in the horizontal and vertical directions, respectively. Tests have shown that the tracking-center horizontal value and the tracking-center vertical value do not change significantly as the SMR is moved nearer to or farther from the laser tracker device 22A.

In an embodiment, the scale-factor parameter is a single-valued parameter found by taking an average of a measured zenith scale factor value and a measured azimuth scale factor value. In an embodiment, the measured zenith scale factor value and the measured azimuth scale factor value are found by capturing images with the two cameras 60 of a retroreflector illuminated by the flashing lights 64. In an embodiment, images acquired by the two cameras 60 are obtained with the laser tracker device 22A pointing in three different directions—(1) pointing directly at the retroreflective target (for example, by temporarily locking into the retroreflective target 24A with the laser beam 52); (2) pointing off the retroreflector center 164 by one degree in the azimuth angle; and (3) pointing off the retroreflector center 164 by one degree in the zenith angle.

In an embodiment, images of the flashing spots on the left and right cameras are used to determine the measured zenith scale factor according to the Equations (1)-(3) below and to determine the measured azimuth scale factor according to Equations (4)-(6) below. Here it is understood that the x-coordinates and the y-coordinates referenced in the equations are the averages of the x-coordinates and the y-coordinates, respectively, of the flashing spots captured by the left camera and the right camera:

$$dy_{pix} = y_{pix\_1deg} - y_{pix\_0deg} \quad \text{(Equation 1)}$$

Where $dy_{pix}$ is the Y-Coordinate Pixel difference, $y_{pix\_1deg}$ is the y-coordinate of target with laser 1 degree off of target in zenith direction, and $y_{pix\_0deg}$ is the y-coordinate of target when laser locked on center.

$$d_{zenith} = zenith_{1deg} - zenith_{0deg} \quad \text{(Equation 2)}$$

Where $d_{zenith}$ is the zenith difference, $zenith_{1deg}$ is the zenith when laser 1 degree off target in azimuth direction, and $zenith_{0deg}$ is the zenith when laser locked on center.

$$\text{scale\_factor}_{zenith} = d_{zenith}/dy_{pix} \quad \text{(Equation 3)}$$

Where $\text{scale\_factor}_{zenith}$ is the measured zenith scale factor.

$$dx_{pix} = x_{pix\_1deg} - x_{pix\_0deg} \quad \text{(Equation 4)}$$

Where $dx_{pix}$ is the x-coordinate pixel difference, $x_{pix\_1deg}$ is the x-coordinate of target w/ laser 1 degree off of target in azimuth direction, and $x_{pix\_0deg}$ is the x-coordinate of target when laser locked on center.

$$d_{azimuth} = azimuth_{1deg} - azimuth_{0deg} \quad \text{(Equation 5)}$$

Where $d_{azimuth}$ is the azimuth different, $azimuth_{1deg}$ is the azimuth when laser 1 degree off target in azimuth direction, and $azimuth_{0deg}$ is the azimuth when laser locked on center.

$$\text{scale\_factor}_{azimuth} = dazimuth/dx_{pix} \quad \text{(Equation 6)}$$

Where $\text{scale\_factor}_{azimuth}$ is the measured azimuth scale factor.

Here $dy_{pix}$ is the y-coordinate pixel difference, $y_{pix\_1deg}$ is the y-coordinate of the flashing spot (averaged for the two cameras) with the tracker aimed one degree off the target center in the zenith direction, and $y_{pix\_0deg}$ is the y-coordinate of the flashing spot with the tracker aimed at the target center. The quantity $d_{zenith}$ is the change in zenith angle for the two directions, which is one degree.

Here $dx_{pix}$ is the x-coordinate pixel difference, $x_{pix\_1deg}$ is the x-coordinate of the flashing spot (averaged for the two cameras) with the tracker aimed one degree off the target center in the azimuth direction, and $x_{pix\_0deg}$ is the x-coordinate of the flashing spot with the tracker aimed at the target center. The quantity $d_{azimuth}$ is the change in azimuth angle for the two directions, which is one degree.

After the compensation process has been completed, the following parameters have been saved in memory: tracking-center horizontal pixel value, tracking-center vertical pixel value, zenith scale factor, and azimuth scale factor. It should be appreciated that during measurements the SMR may be located off the tracker optical axis. In an embodiment, geometrical formulas use the saved parameters to determine the zenith and azimuth angles to which the tracker should be aimed to arrive at the selected point on the mobile device 30, as described further herein.

Based on FIG. 5, it might be supposed that the left disparity 157A and right disparity 157B of the imaged flashing spot 155 might need to be accounted for (in order to get an estimate of distance to the retroreflector target). However, this is not actually the case if the tracking center is based on the average of the spot on the left and right camera images. It has been found that, for the geometry described above, the tracking position and scale factor described here can be used for SMRs located at all distances from the tracker.

By pointing at a location on the display of a mobile device, the tracking-point and scale-factor parameters can be used to move the tracker to aim at that point. If a retroreflector is at that point, the tracker can further be made to lock onto the retroreflector, as described herein below.

Figure 6:
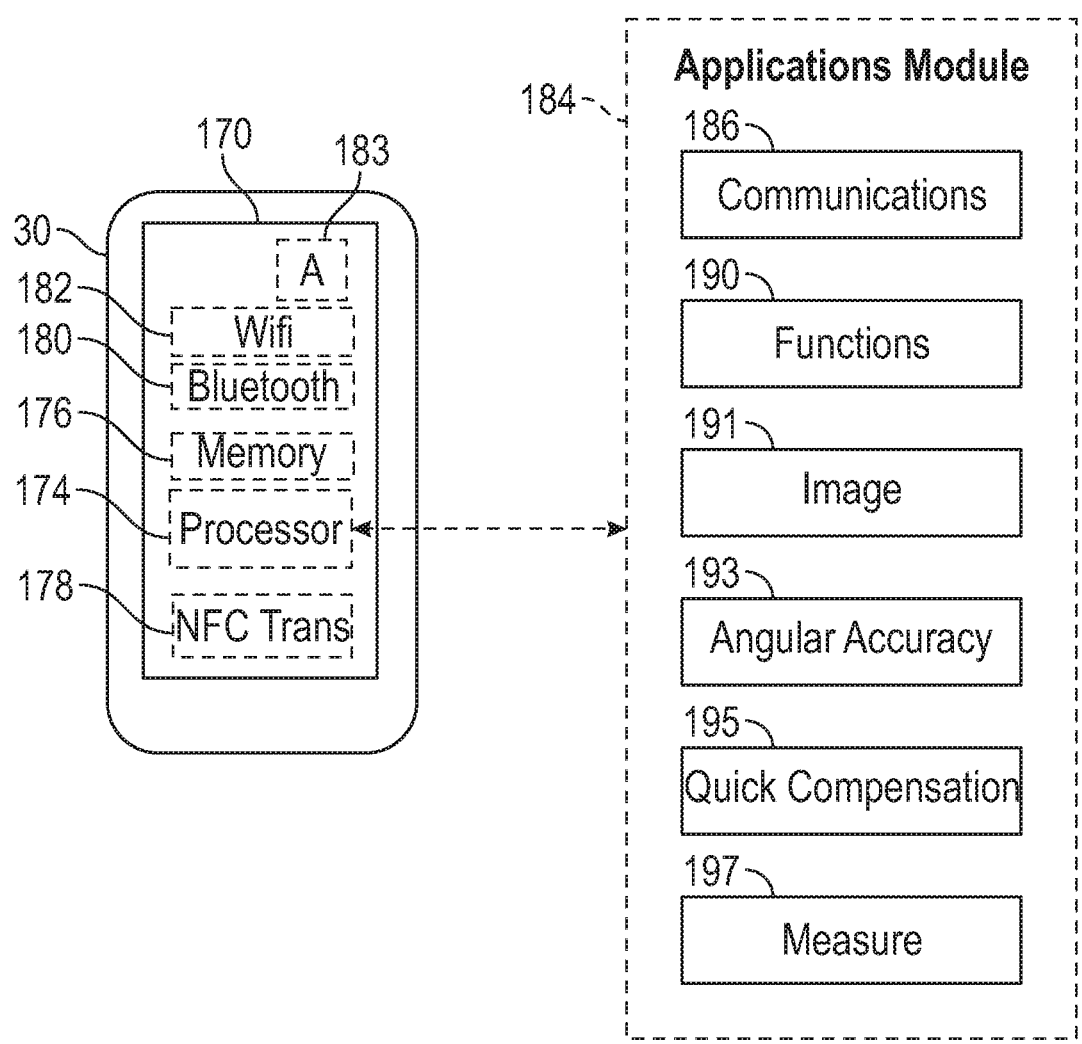
FIG. 6 is a block diagram of a mobile computing device in accordance with one or more embodiments of the invention.

Referring now to FIG. 6, an embodiment is shown of the mobile computing device 30, such as a cellular phone for example. The mobile computing device 30 may also be a smart pad, laptop computer, smart music player, or other type of smart device. In the exemplary embodiment, the mobile computing device 30 includes a display 170 that presents a graphical user interface (GUI) 172 (FIG. 7) to the user. In one embodiment, the GUI 172 allows the user to view data, such as an image acquired by the camera 60 or measured coordinate data for example, and interact with the mobile computing device 30. In one embodiment, the display 170 is a touch screen device that allows the user to input information and control the operation of the mobile computing device 30 using their fingers. The mobile computing device 30 further includes one or more processors 174 that are responsive to executable computer instructions and to perform functions or control methods, such as those described herein. The mobile computing device 30 may further include memory 176, such as random access memory (RAM) or read-only memory (ROM) for example, for storing application code that is executed on the processor 174 and storing data, such as coordinate data for example. The mobile computing device 30 further includes communications circuits, such as near field communications (ISO 14443) circuit 178, Bluetooth (IEEE 802.15.1 or its successors) circuit 180 and WiFi (IEEE 802.11) circuit 182 for example. The communications circuits 178, 180, 182 are transceivers, meaning each is capable of transmitting and receiving signals. It should be appreciated that the mobile computing device 30 may include additional components and circuits, such as a cellular communications circuit, as is known in the art.

The mobile computing device 30 may further include additional modules or engines 184, which may be in the form of application software that execute on processor 174 and may be stored in memory 176. One such application, such as that illustrated in FIGS. 7-18 for example, allows the user to control or issue commands to the laser tracker devices 22A-22E via the computer network 26. In an embodiment, the engine 184 includes a number of sub-modules that facilitate communication and control of the laser tracker device the engine 184 is connected to.

Figure 7:
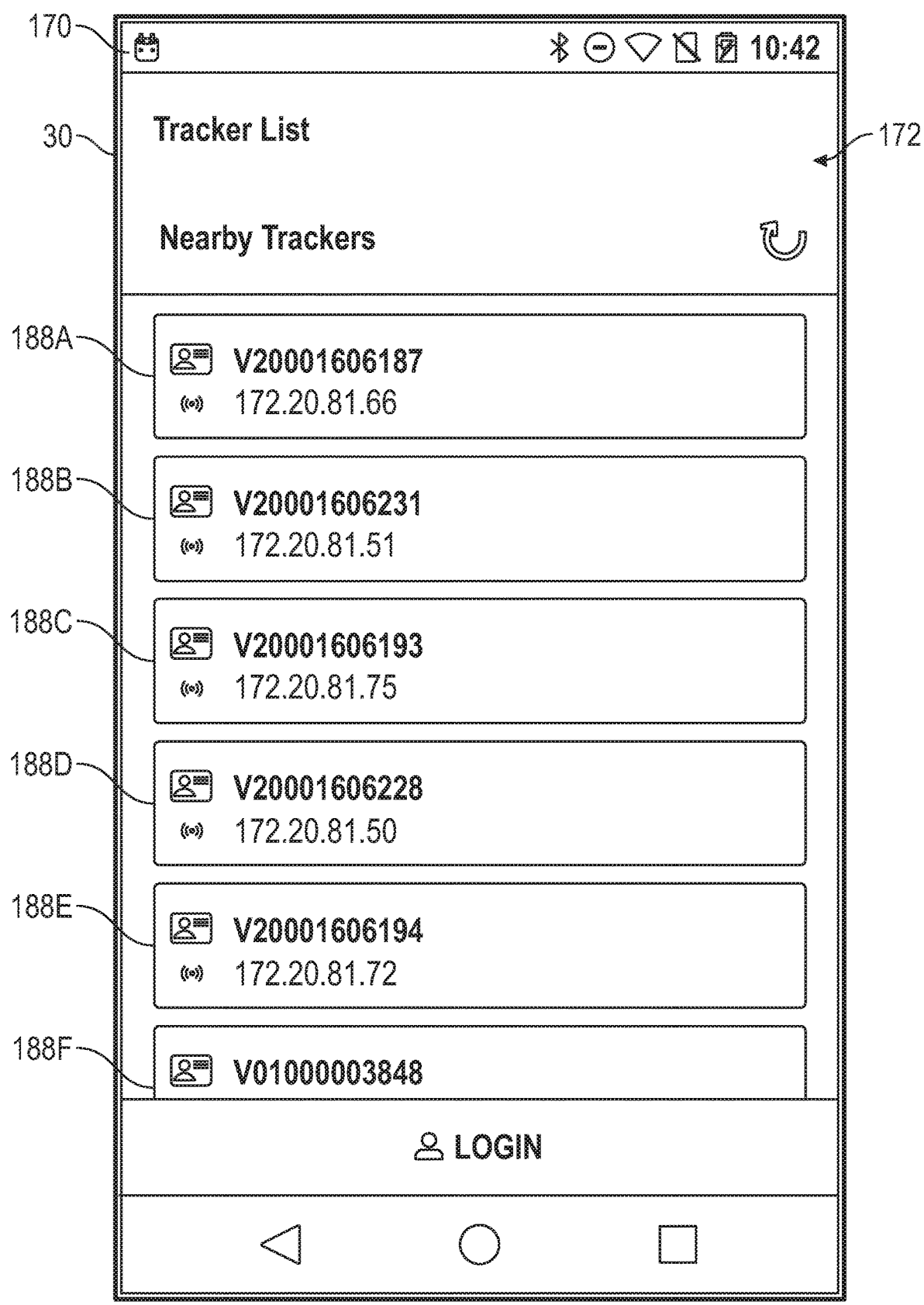
FIG. 7-18 illustrate graphical user interfaces of a system for controlling the laser tracker device with the mobile computing device.

In an embodiment the engine 184 includes a communications module 186 that provides searching capabilities to identify laser tracker devices that are connected to the computer network 26 and establish communications, such as using the Wifi circuit 182 or Bluetooth circuit 180 for example. In one embodiment, the communications module 186 may query the computer network to identify laser tracker devices that are available. Having compiled a list of devices, the engine 184 displays a list on a graphical user interface (GUI) 172 as shown in FIG. 7. In an embodiment, the laser tracker devices listed with the serial number or a user definable name. The IP or computer network address may also be displayed. In an embodiment, each of the laser tracker devices is displayed on the GUI 172 as an individual element 188A-188F. These elements 188A-188F are selectable, meaning if the user selects element 188D, which corresponds to laser tracker device serial number V20001606228, the communications module 186 will connect the engine 184 to the selected laser tracker device and allow transmission of signals therebetween.

Figure 8:
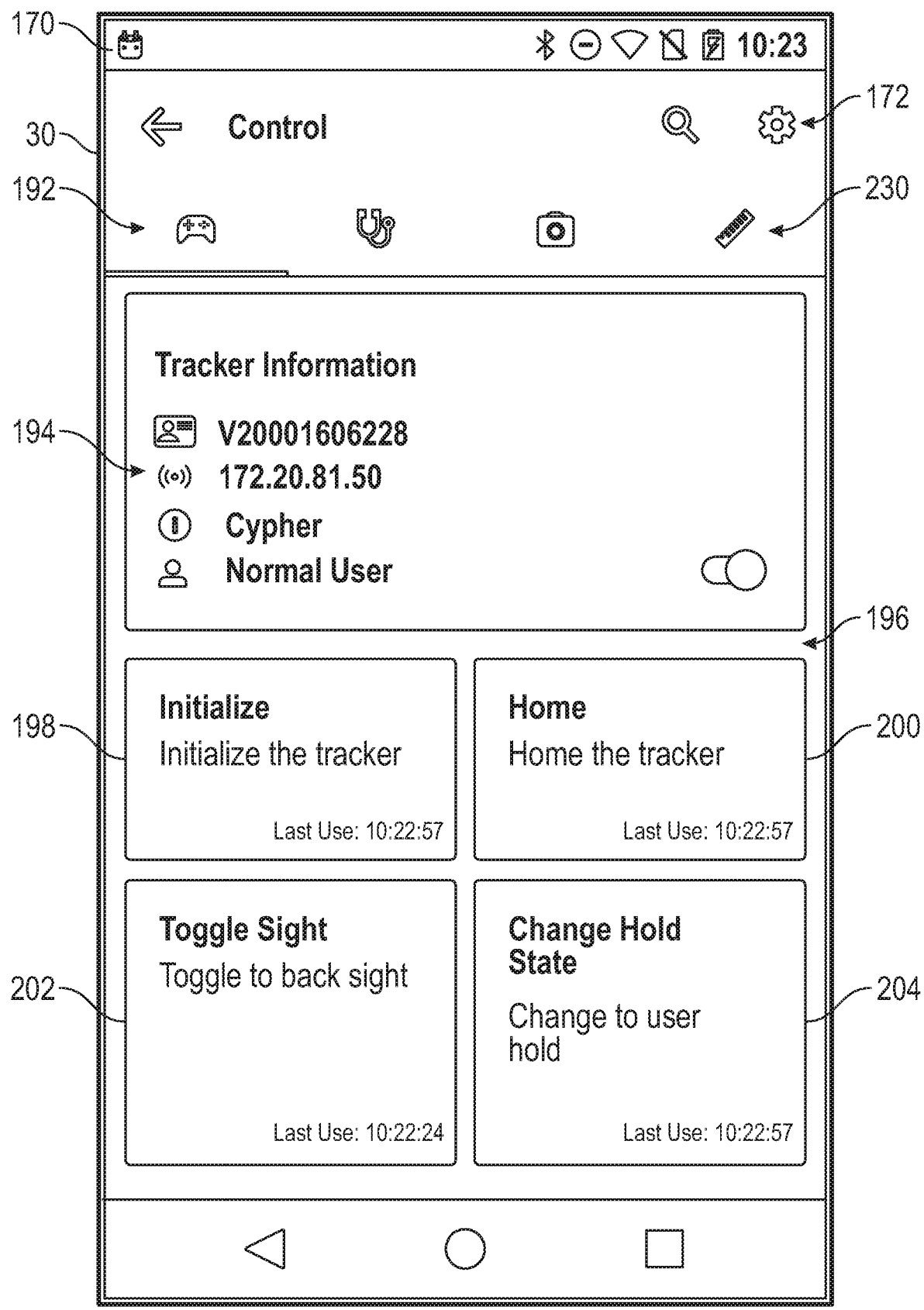

In an embodiment, the engine 184 may also include functions modules 190 that provides the user with access to control functions that are available with the laser tracker device that has been selected. In an embodiment, the function module displays a plurality of elements on the GUI 172 as shown in FIG. 8. Along the top of the display 170 are a row of graphical elements 192 that provide graphical representations of modules available in engine 184. Next, the identification element 194 provides the user with information about the laser tracker device to which the mobile computing device 30 is connected. This information may include the laser tracker device's serial number or user defined name, the Internet Protocol (IP) or computer network address, the model number of the laser tracker device and the user's account status.

Next, the functions module 190 provides a list of control elements 196 that allow the user to interact and control the laser tracker device. In an embodiment, the control elements 196 include an Initialize element 198, a Home element 200, a Toggle Sight element 202 and a Change Hold State element 204. The Initialize element 198 changes the state of the laser tracker device and readies the device to be used for performing measurements. The Home element 200 moves the laser tracker device to its "home" position. In an embodiment, the home position is a position to which the light beam 52 is directed towards an SMR placed on one of the magnetic nests 58. The Toggle Sight element 202 allows the user to change the laser tracker device between a front-sight and a back-sight orientation. The Change Hold State element 204 allows the user to toggle between a hold-position state and a hold-velocity state. In the hold-position state, the laser tracker control system attempts to keep the light beam 52 locked onto the retroreflector 24A. If a user attempts to move the laser tracker payload 46 in this state, the laser tracker will resist, attempting instead to keep the light beam 52 centered on the retroreflector 24A. In the hold-velocity state, the laser tracker control system allows the user to manually adjust the position of the laser tracker payload 46 and zenith carriage 40. In the hold-velocity state, the laser tracker does not right against the selected direction but tends to hold the selected direction once user stops applying force to the payload.

Figure 9:
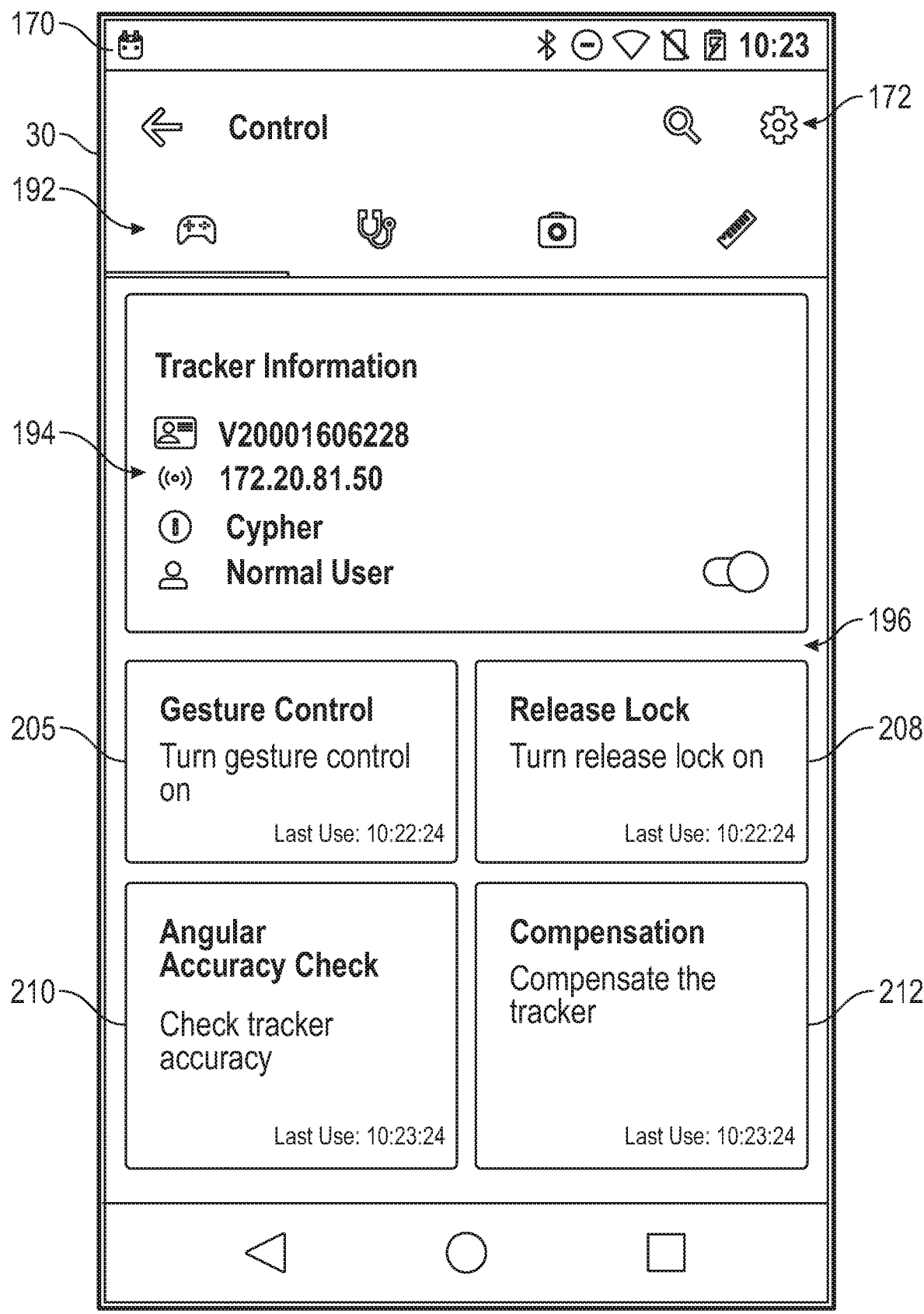

In an embodiment, the control element 196 portion of the GUI 172 is scrollable, meaning that the user may access additional control functions by scrolling this portion to reveal additional elements. Referring now to FIG. 9, another set of control function elements are shown. These control function elements includes a Gesture Control element 205, a Release Lock element 208, an Angular Accuracy Check element 210 and a Compensation element 212. The Gesture Control element 205 allows the user to activate or deactivate gesture control for the selected laser tracker device. Gesture control allows an operator to control the laser tracker device by using gestures, such as hand signals or a movement of the retroreflective target in a pattern. Gesture controls of a laser tracker are described in commonly owned U.S. Pat. Nos. 8,654,354, 9,383,189 and 9,234,742, the contents of which are incorporated by reference herein. The Release Lock element 208 allows the user to switch control between the mobile device 30 and another computing device such as a computing device 28. Only one computing device is allowed to control a tracker 22A at a given time.

Figure 15:
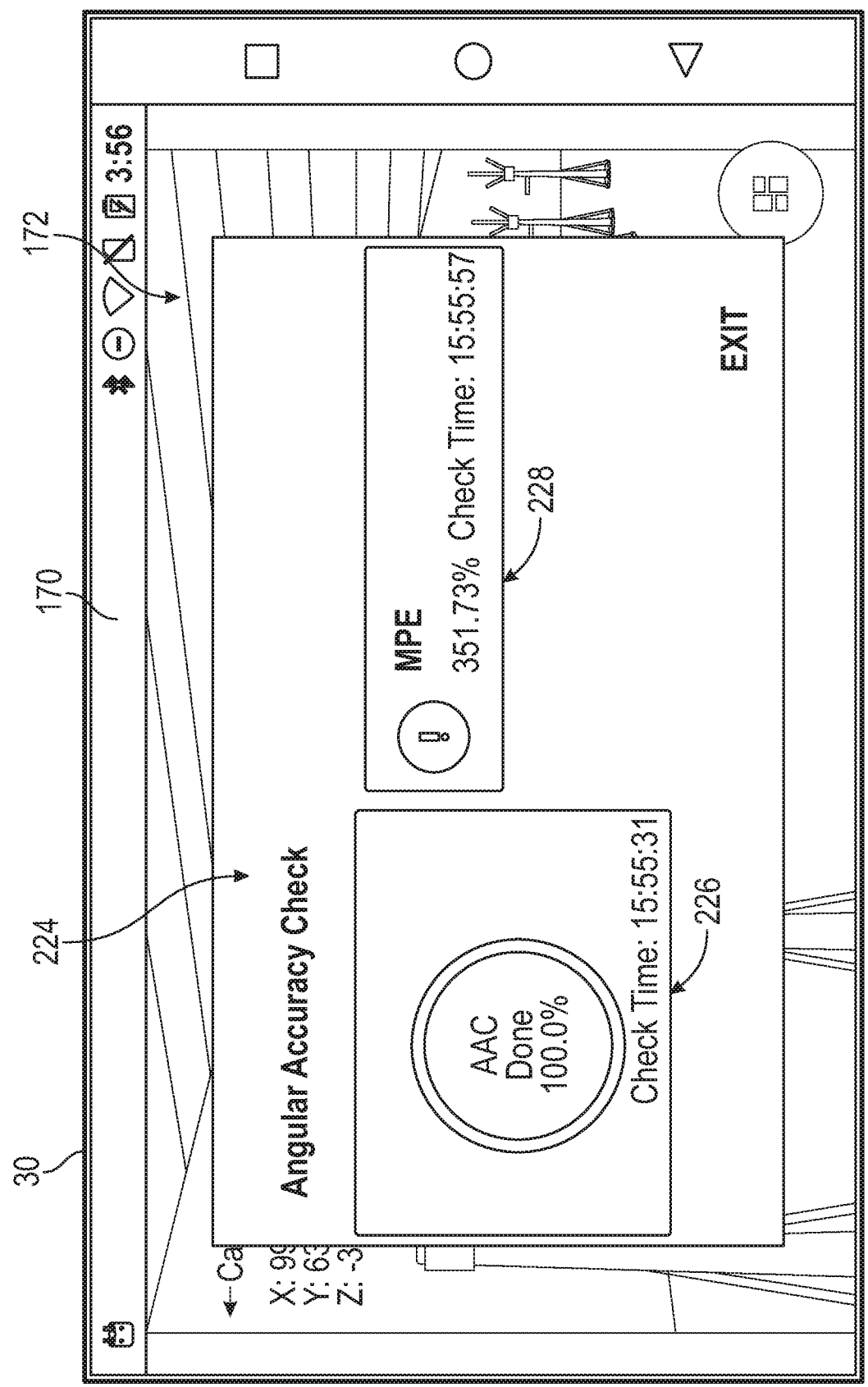
Figure 16:
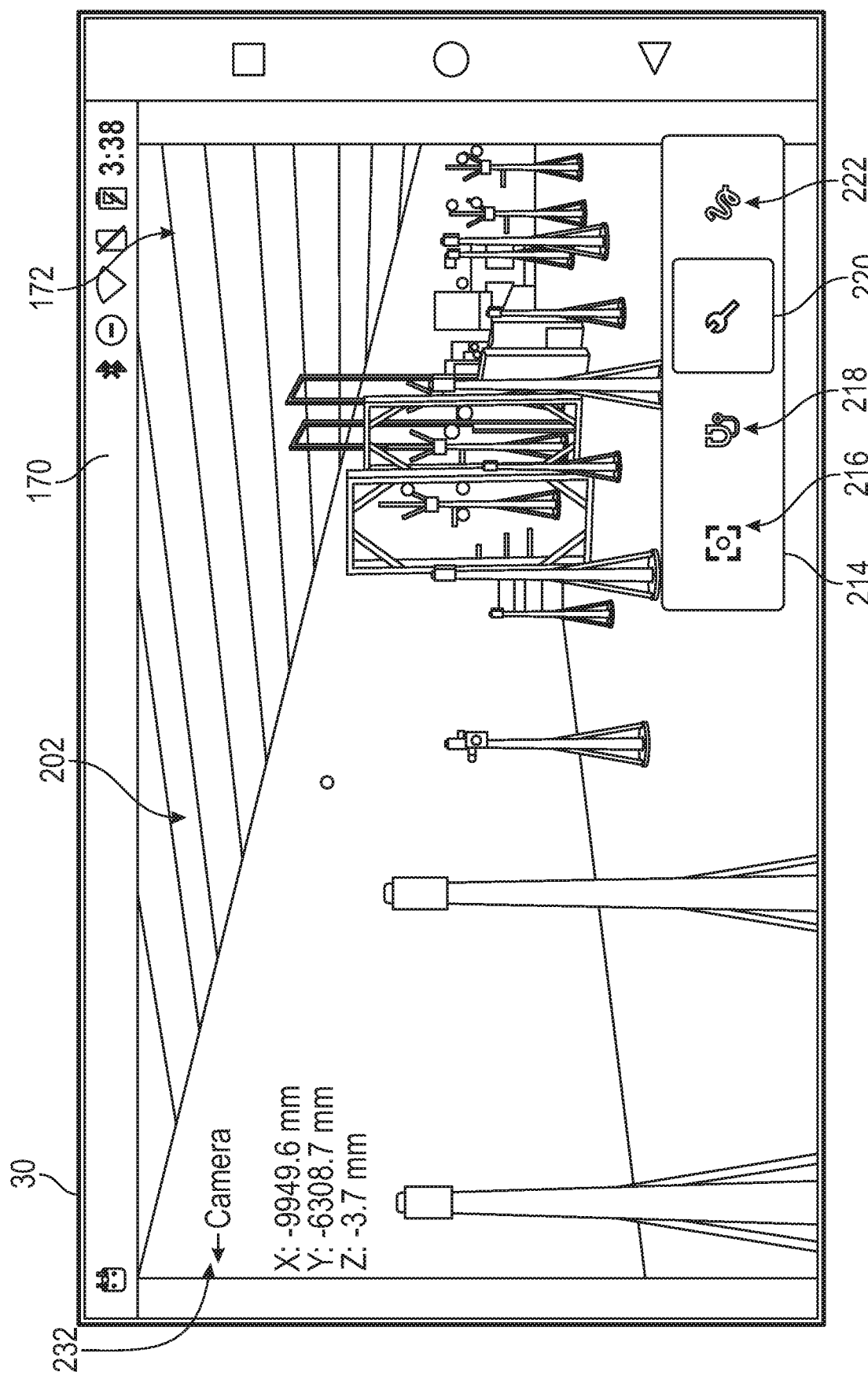

As discussed in more detail herein in reference to FIG. 15, the Angular Accuracy Check element 210 allows the user to initiate an accuracy test of the laser tracker device to determine if the laser tracker device is currently performing within acceptable limits. In an embodiment, the angular accuracy check performs a front-sight measurement and a back-sight measurement of a retroreflector target and calculates the transverse distance (error) between measured front-sight coordinates and back-sight coordinates. The resulting error should fall within the specified maximum permissible error (MPE) of the laser tracker, as given in laser tracker specifications provided by the manufacturer.

The compensation element 212 allows the user to initiate a compensation process, which in an embodiment is a particular type of compensation process referred to as a quick compensation process. As discussed in more detail herein, the quick compensation process allows for determining new values for the compensation parameters Rx and Ry (each having units of microradians) to adjust the measurements to improve laser tracker angular accuracy.

Figure 10:
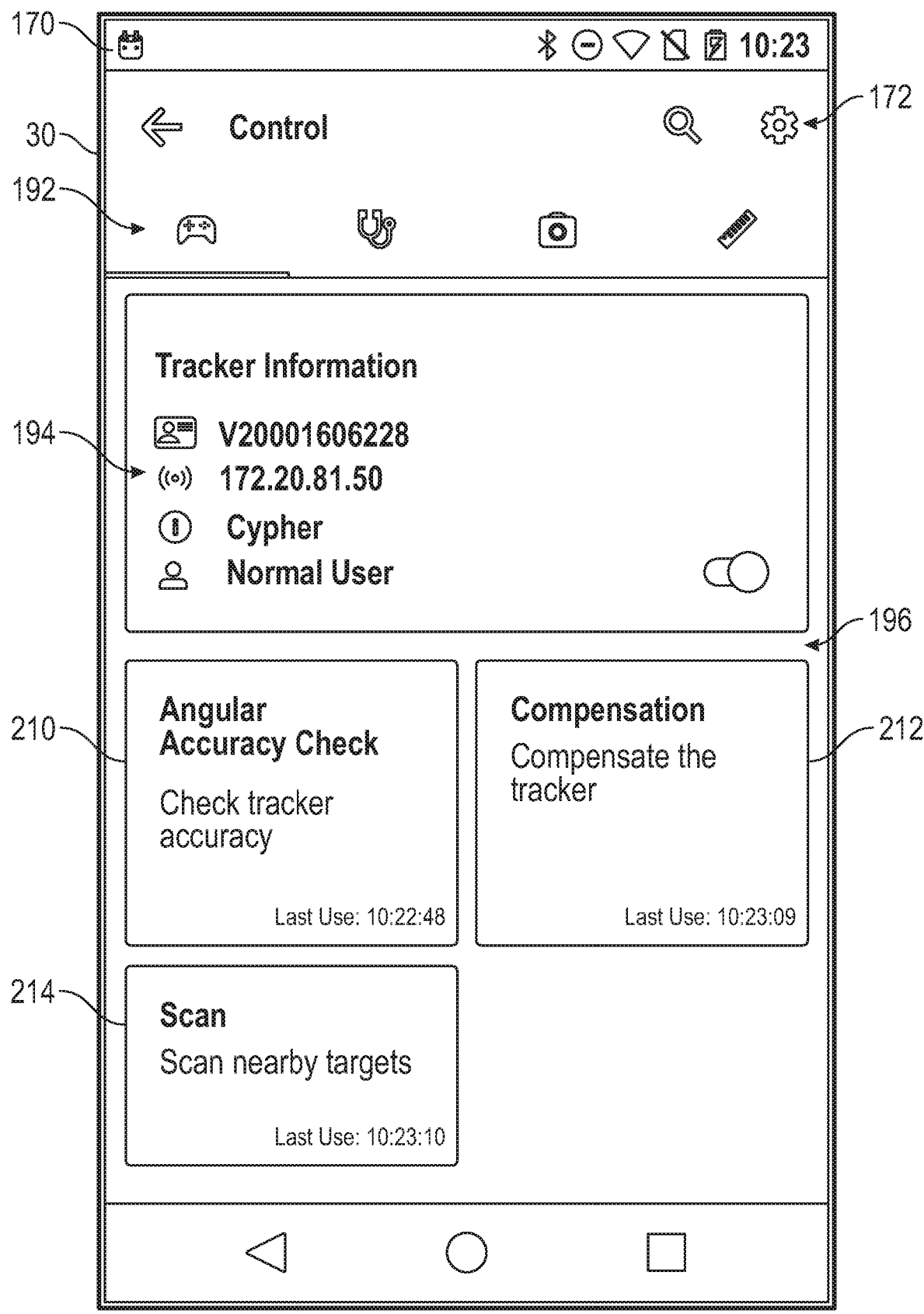

Referring now to FIG. 10, a Scan element 214 is obtained by scrolling the control element 196 portion. The Scan element 214 allows the user to initiate operation of the laser tracker device to scan for retroreflective targets that are near the selected laser tracker device.

Figure 11:
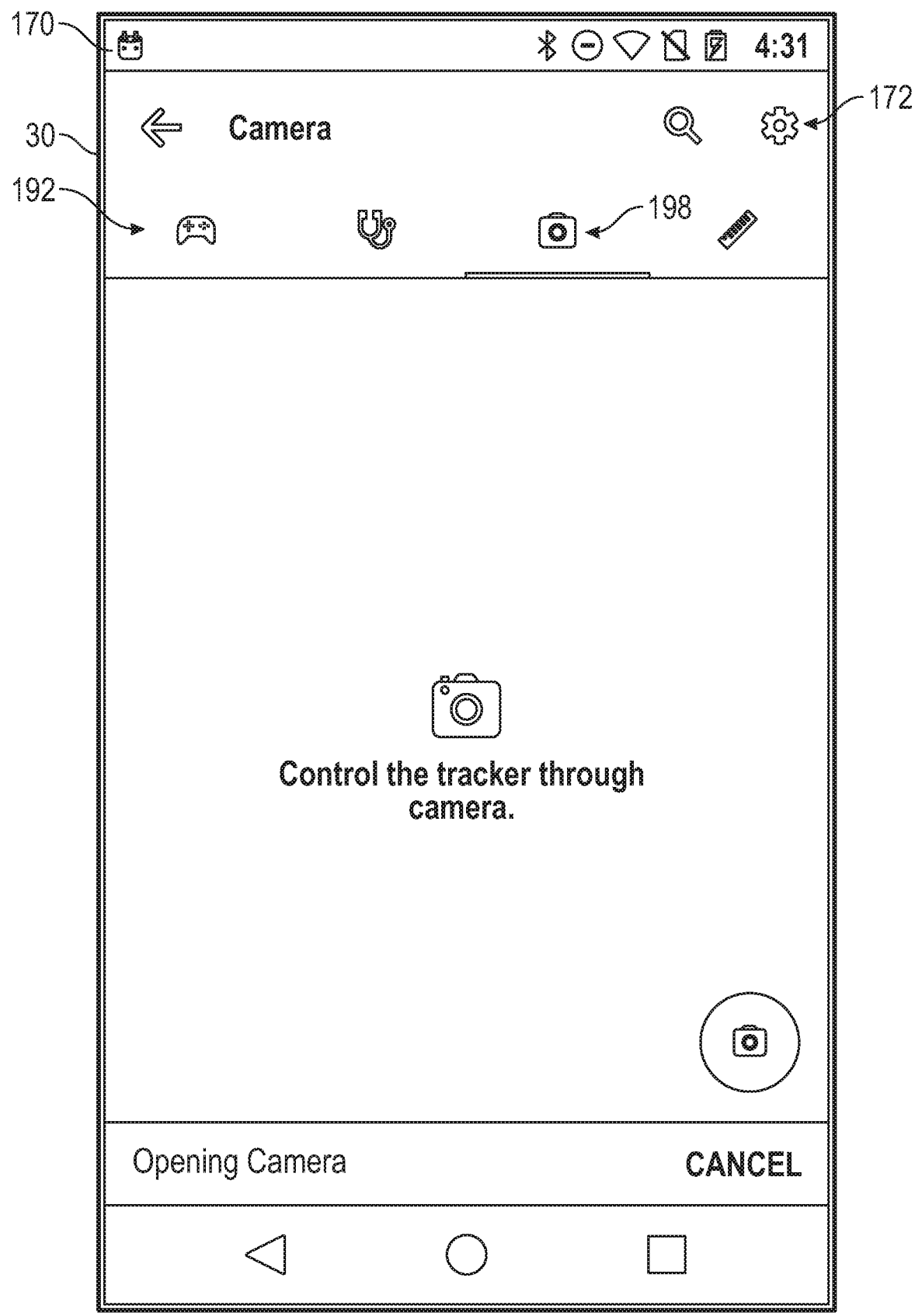
Figure 12:
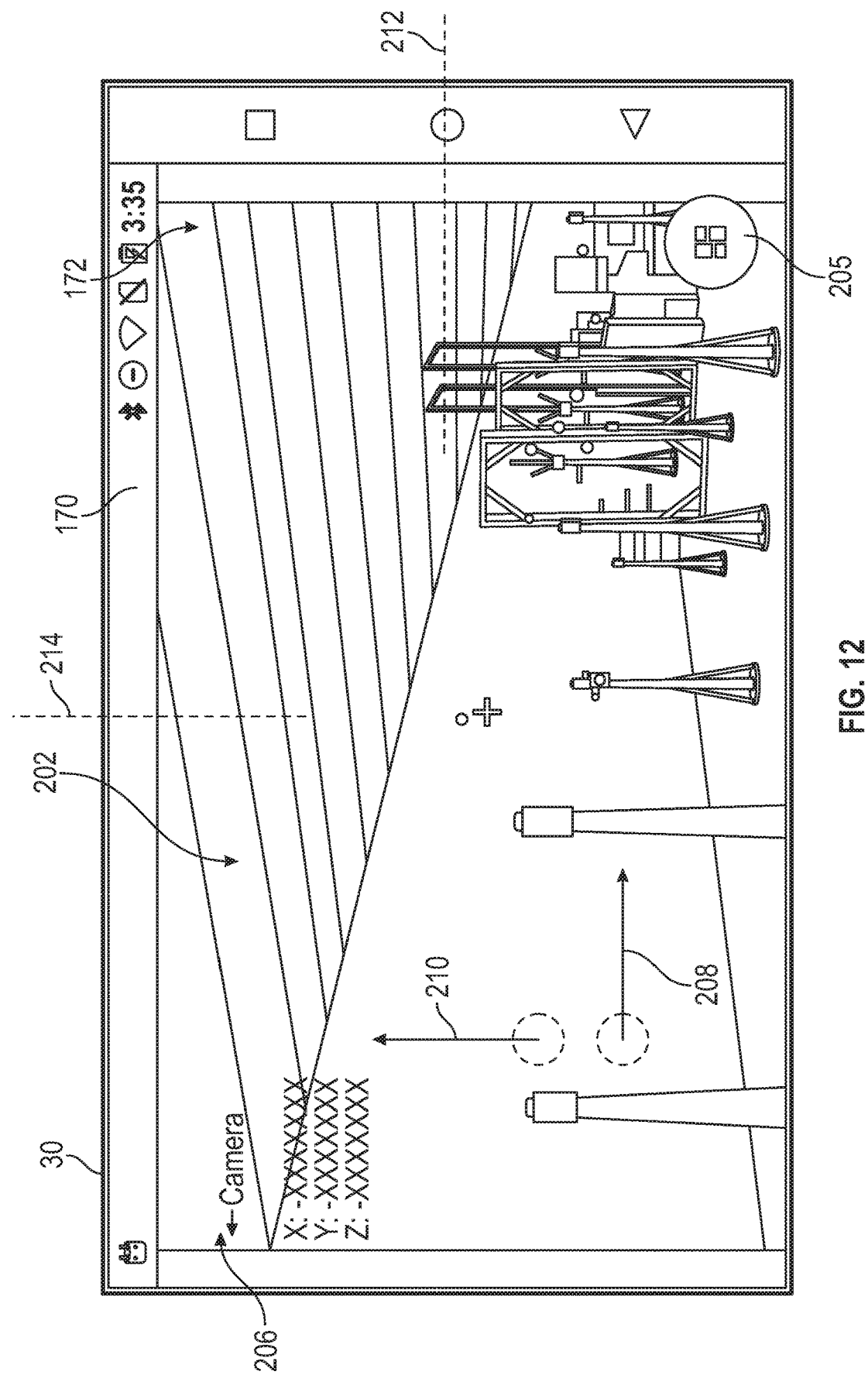

In the exemplary embodiment, the graphical elements allow the user to quickly access commonly used control functions. Referring now to FIGS. 11-13, the engine 184 includes a module 191 that allows the user to select the camera icon or graphical element 198. In an embodiment, this control element 198 first brings the user to the GUI 172 of FIG. 11. By selecting the circular icon 200, the current image being acquired by the camera 60 of the selected laser tracker device is displayed on the display 170 as shown in FIG. 12. While in this GUI 170, the user can control the orientation of the selected laser tracker device using the graphical image 202. Further, the GUI 172 of FIG. 12 includes a graphical element 205 that provides additional controls directly from this GUI 172. The GUI 172 of FIG. 12 also provides measurement elements 206. As discussed in more detail below, the measurement elements 206 provide the coordinates to a selected retroreflective device.

In an embodiment, to control the orientation of the selected laser tracker device, the user may touch the display 170 and move their finger in a direction over the image 202. In response to the user input, a signal is transmitted to the processing system 68 and the processor 74 causes the payload functions 76 to activate the motors 54, 56 to move the payload 46 in the direction indicated by the movement of the user's finger. For example, if the user touches the display 170 and moves their fingertip in the direction indicated by arrow 208, the payload 46 will be rotated about the azimuth axis 44 to the right (in the opposite direction of the arrow 208). Similarly, if the user touches the display 170 and moves their fingertip vertically in the direction of arrow 210, the payload 46 will be rotated about the zenith axis 48 in the downward direction (in the opposite direction of the arrow 210). It should be appreciated that if the user moves their fingertip along a diagonal direction, the payload 46 may be rotated about both the azimuth axis 44 and zenith axis 48 simultaneously. In an embodiment, the payload 46 will continue to rotate in the direction indicated by the movement of the fingertip until the user taps the display again.

In still another embodiment, the user may change the orientation of the payload 46 by touching the display 170 in the area of the image 202 that the user desires the laser light 52 to be directed. In response to the user input, a signal is transmitted to the processing system 68 and the payload 46 is rotated about the zenith axis 48 and the azimuth axis 44 to direct the laser light 52 in the desired direction that corresponds to the point the user touched on the image 202. In an embodiment, the user input to reorient the payload to an arbitrary location is a double touch (e.g. a double tap) of the display 170 by the user with their finger or a stylus within a predetermined amount of time.

In another embodiment, rather than the user input being a touching of the display 170 by the user, the user may move the mobile computing device 30 in space. For example, in an embodiment, rotating or tilting the mobile computing device 30 about an axis that is parallel to a side, such as axis 212 for example, is detected by an accelerometer 183 (FIG. 6) in the mobile computing device 30. In response, the mobile computing device 30 transmits a signal to the processing system 68 and the processor 74 causes the payload functions 76 to activate the motor 56 (via motor control 98) and rotate the payload 46 about zenith axis 48. In an embodiment, when the user rotates the mobile computing device 30 about the axis 214, the movement is detected by the accelerometer 183 and a signal is transmitted to the processing system 68. In response, processor 74 causes the payload functions 76 to activate the motor 54 (via motor control 98) and rotate the payload 46 about the azimuth axis 44.

Figure 13A:
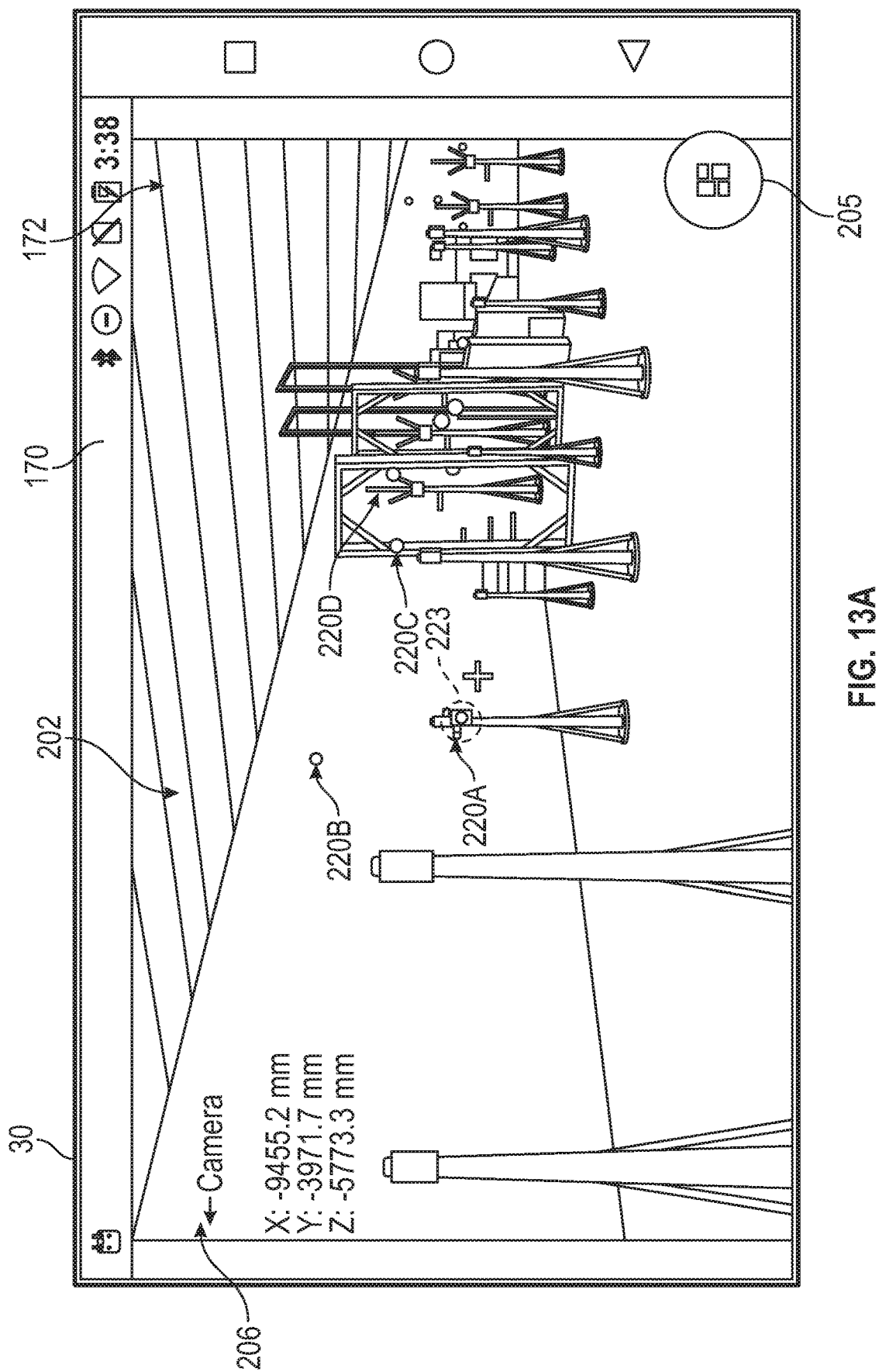
Figure 14:
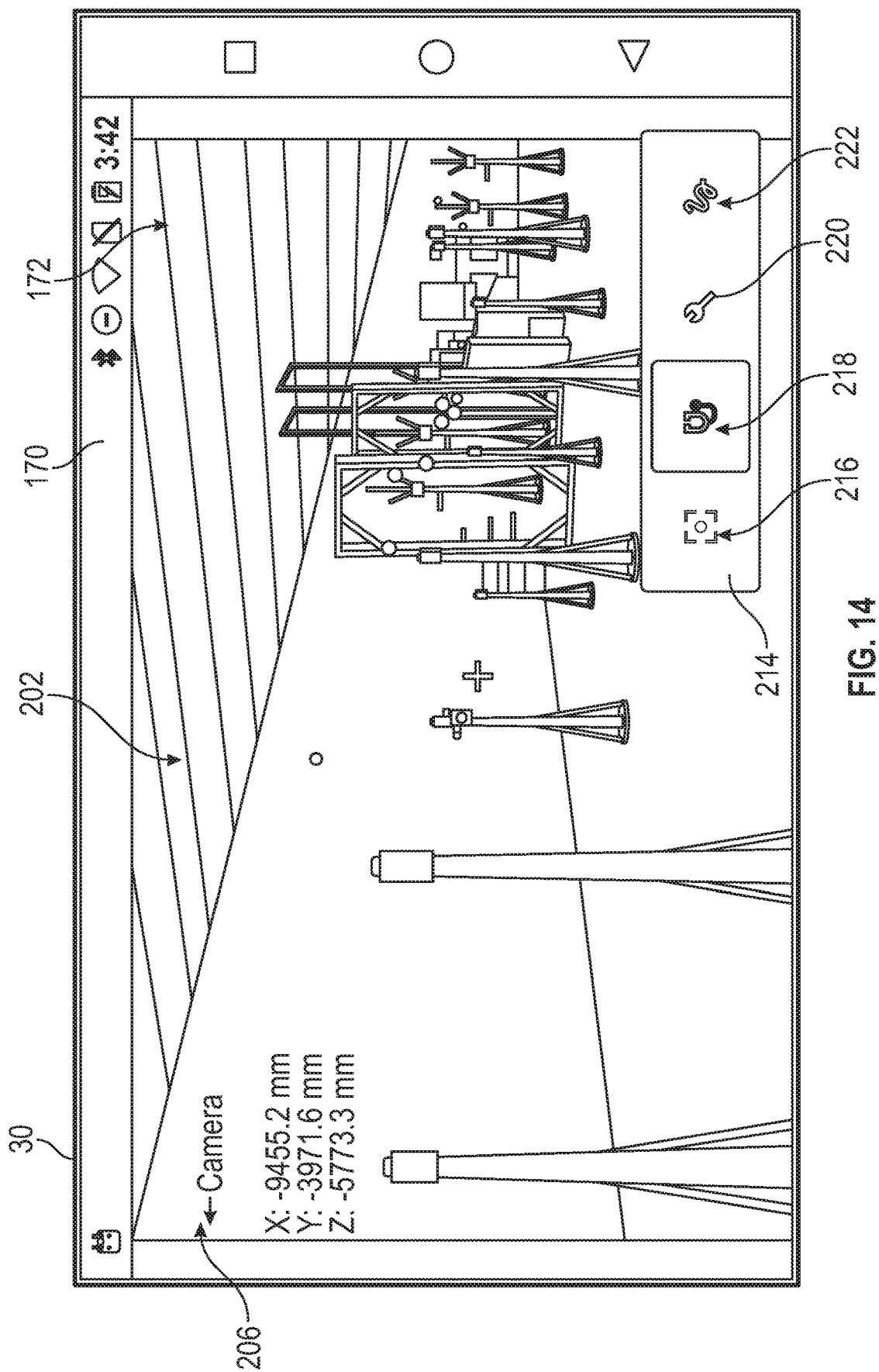

Referring now to FIG. 13A, in an embodiment, the module 191 further includes control functions for automatically identifying retroreflective targets in the image displayed on the display 170 of mobile computing device 30. This control function may be performed automatically upon entering the image display or by having the user select a graphical element 216 (FIG. 14). In an embodiment, pressing the icon 216 causes the laser tracker 22A to lock onto the retroreflective target nearest the center of the captured image. If there is only one retroreflector in the image, pressing the icon 216 will cause the laser tracker to automatically lock onto the retroreflective target in the image. In another embodiment, the icon 216 is selected by default and automatically locks onto an observed retroreflective target. In these embodiments, a signal is transmitted from the mobile computing device 30 to the processing system 68 via the computer network 26. In response, the processing system 68 activates, flashes or strobes the lights 64. It should be appreciated that some of the light from lights 64 will be reflected back toward the laser tracker device. This will include light that strikes the retroreflective target and any other reflective surfaces in the environment. This reflected light will appear as spots of light 220A-220D for example. However, it should be appreciated that not all of these spots of light are retroreflective targets.

In an embodiment, a method is performed to determine which of the spots of light 220A-220D are generated by a retroreflective target. The process starts by flashing lights 64 around the tracker target cameras 60 to illuminate the retroreflectors. A series of at least three frames or images are acquired while the light from lights 64 are flashing. The images are compared. In an embodiment, three conditions are used to identify a light spot as a retroreflector. First, the light spot has at least a certain predetermined minimum illumination level. Second, a difference is determined between the maximum illumination level and the minimum illumination level of the light spot. The difference in illumination levels must be greater than a predetermined level. Third, the spot of light that satisfies the first and second condition is seen in at least three consecutive frames. The illumination level has a quantitative value that depends on the number of electrons in a given pixel in the photosensitive array of the camera 60. In an embodiment, the illumination level is reported with a value between 0 and 255 (8 bits).

In an embodiment, the predetermined level for the maximum illumination level (when the retroreflector is illuminated by the flashing lights) may be set to be at least 120 and the predetermined level for the minimum illuminated level (when the retroreflector is not illuminated by the flashing lights) is set to not exceeding 30.

In still another embodiment, the predetermined level for the maximum illumination level (when the retroreflector is illuminated by the flashing lights) of at least 120 and the predetermined level for the difference between the maximum illumination level and the minimum illuminated level (when the retroreflector is not illuminated by the flashing lights) is set to be at least 90. In this embodiment if the maximum illumination level is 170, the minimum illumination level would be set to be smaller than 170−90=80.

In the exemplary embodiment, when a light spot captured as an image is identified as being a retroreflective target, such as spot of light 220A, the spot is marked with a graphical indicator (for example, with a colored disk 223) to indicate that the light spot is a retroreflective target. In another embodiment, the color of the spot of light 220A is changed to a different color.

Figure 13B:
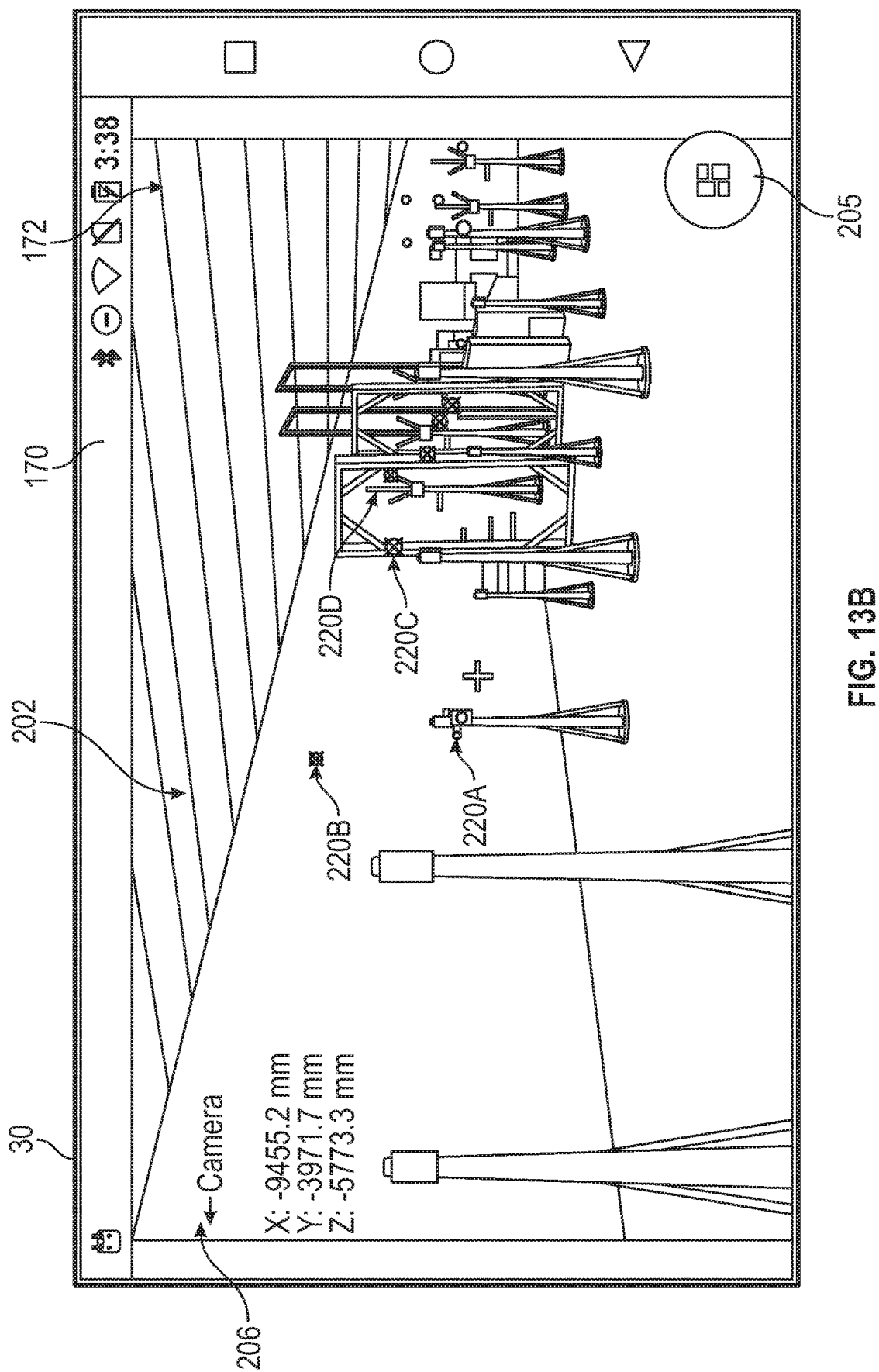

In another embodiment, shown in FIG. 13B, instead of marking the location of the retroreflector, the reflections (e.g. spots of light 220B, 220C, 220D) that are not from a retroreflective device are marked with a graphical indicator 225 (e.g. an "X"). This allows the operator to quickly identify the locations of retroreflective targets, such as spot of light 220A. It should be appreciated that in some embodiments, the spots of light from retroreflectors, such as spot of light 220A are also simultaneously marked with a colored disk 223, while the non-retroreflector reflections 220B, 220C, 220D are marked with graphical indicator 225.

It should be appreciated that multiple retroreflective targets may be identified in the image 202. Once the retroreflective targets have been identified, the user may select one of the retroreflective targets by touching the image 202 on display 170 at or near the location of the retroreflective target. In an embodiment, to lock onto the retroreflective target, the user input is a touch on the display for a predetermined amount of time (e.g. 2 seconds). The pixel value for the area touched, (such as by determining the center of the area touched) is transferred to the pixel value of the cameras 60 through pixel interpolation based at least in part on the method described herein with reference to FIG. 5.

Upon reaching an appropriate orientation to direct the laser light 52 towards the selected retroreflective target, the laser tracker device will attempt to lock onto the retroreflective target. In some embodiments, the change in orientation of the payload will direct the laser light towards the retroreflective device, but not with the accuracy for locking on. When this occurs, the laser tracker device may perform a search method, such as a spiral search method, for locating and locking onto the retroreflective target. In such a spiral search, the measurement beam is moved in a spiral pattern about an originally set direction until receiving back a reflected light beam (such as light beam 148 for example) that indicates the payload 46 is oriented in the desired direction.

As discussed below, once the laser tracker device is locked onto the retroreflective device, the user may make measurements and obtain the coordinates of the retroreflective device in the laser tracker device frame of reference.

In an embodiment, when the laser tracker device attempts to lock onto the retroreflective target and no target is found with a predetermined period of time, the designation of the spot of light may be changed on the GUI 172. In an embodiment, the graphical indicator associated with the spot of light (e.g. spot of light 220A) may be changed, such as from the circle 223 to the "X" 225 for example.

It should be appreciated that in metrology applications, accurate measurements are desired. In an embodiment, the engine 184 includes a module 193 that allows the user to test the accuracy of the measurements. The user initiates the accuracy and compensation processes by tapping on the graphical element 205 with their finger, which causes a menu 214 to be displayed that includes a plurality of graphical elements representing control functions commonly used when in this mode of operation. In an embodiment the menu 214 includes the target lock-on control element 216, an accuracy check control element 218, a compensate control element 220 and a gestures control element 222.

In an embodiment, the user may select accuracy check control element 218 (or control element 210, FIG. 10) to initiate a method that tests the accuracy of the laser tracker device. In some embodiments, an accuracy of a laser tracker 22A may degrade with changes in background temperature, with mechanical shocks to the laser tracker, or may simply drift over time. In an embodiment, the accuracy of the laser tracker device is checked using the method described in commonly owned U.S. Pat. No. 7,327,446, the contents of which are incorporated by reference herein. The accuracy is determined by measuring one or more retroreflective targets in a front-sight mode and a back-sight mode. The front-sight mode of the tracker may be considered to be the normal mode of operation of the tracker. The tracker is put into a back-sight mode by rotating the tracker about the azimuth axis 44 by 180 degrees and then taking the negative of the zenith angle by rotating about the zenith axis 48 to point the beam of light 52 back at the retroreflective target. After locking onto the retroreflective target in back-sight mode, the obtained 3D readings would be the same as in front-sight mode in an ideal tracker. The transverse error between the front-sight mode and the back-sight mode is referred to as a two-face error. Every laser tracker has a specification for the maximum permission two-face error, with the specification given as an MPE value provided by the manufacturer.

If a tracker does not meet its specified two-face MPE value, an operator may elect to perform a compensation procedure to obtain new compensation parameters to improve tracker measurement accuracy. This compensation function may be performed by pressing on the icon 220 in FIG. 14. In an embodiment, pressing the icon 220 causes the tracker to perform a quick compensation, which is a compensation procedure made on a single retroreflector target by performing a front-sight and a back-sight measurement on the retroreflector target. The collected values from the front-sight and the back-sight measurements are used to determine a new RX and a new RY parameter. These are angular parameters that relate to the direction of the beam of light 52 in relation to the zenith axis 48 and to the zero angle of the encoder that measures the azimuth angle of the azimuth axis 44. Often this simple procedure is sufficient to obtain performance that is well within specification.

In another embodiment, an operator may elect a different type of compensation such as self-compensation. This type of compensation, also described in commonly owned U.S. Pat. No. 7,327,446, which is incorporated by reference herein, obtains four laser tracker parameters RX, RY, TZ, TY by measuring two targets, such as a mirror and a retroreflective target, located on the laser tracker device. In another embodiment, a more comprehensive compensation procedure, referred to as "pointing compensation," is performed by measuring multiple retroreflective targets located at different distances and at different angles from the tracker, the measurements performed both in front-sight and back-sight modes. A pointing compensation may determine tracker parameters in addition to the RX, RY, TX, and TY parameters described herein above.

When the angular accuracy check (AAC) has been performed, an accuracy report element 224 is displayed on the display 170 as shown in FIG. 15. In an embodiment, the accuracy report element includes a status element 226 and a results element 228. In an embodiment, the results element displays the performance of the laser tracker device relative to a predetermined maximum permissible error (MPE) parameter. In the embodiment of FIG. 15, the laser tracker device is 351.73% of the MPE, which places the laser tracker out-of-specification.

When the laser tracker device performs outside of the desired MPE, the user may initiate a compensation process, such as by selecting compensate control element 220 (FIG. 16) for example. Any compensation method, including the quick compensation (described hereafter), the self-compensation, and the pointing compensation may be used to obtain compensation parameters. In the exemplary embodiment, the engine 184 includes a rapid or quick compensation module 195 that may be performed by measuring a single retroreflective target, such as the selected retroreflective target for example, and replacing the current RX and RY compensation parameters with the newly determined RX and RY parameters.

Figure 17:
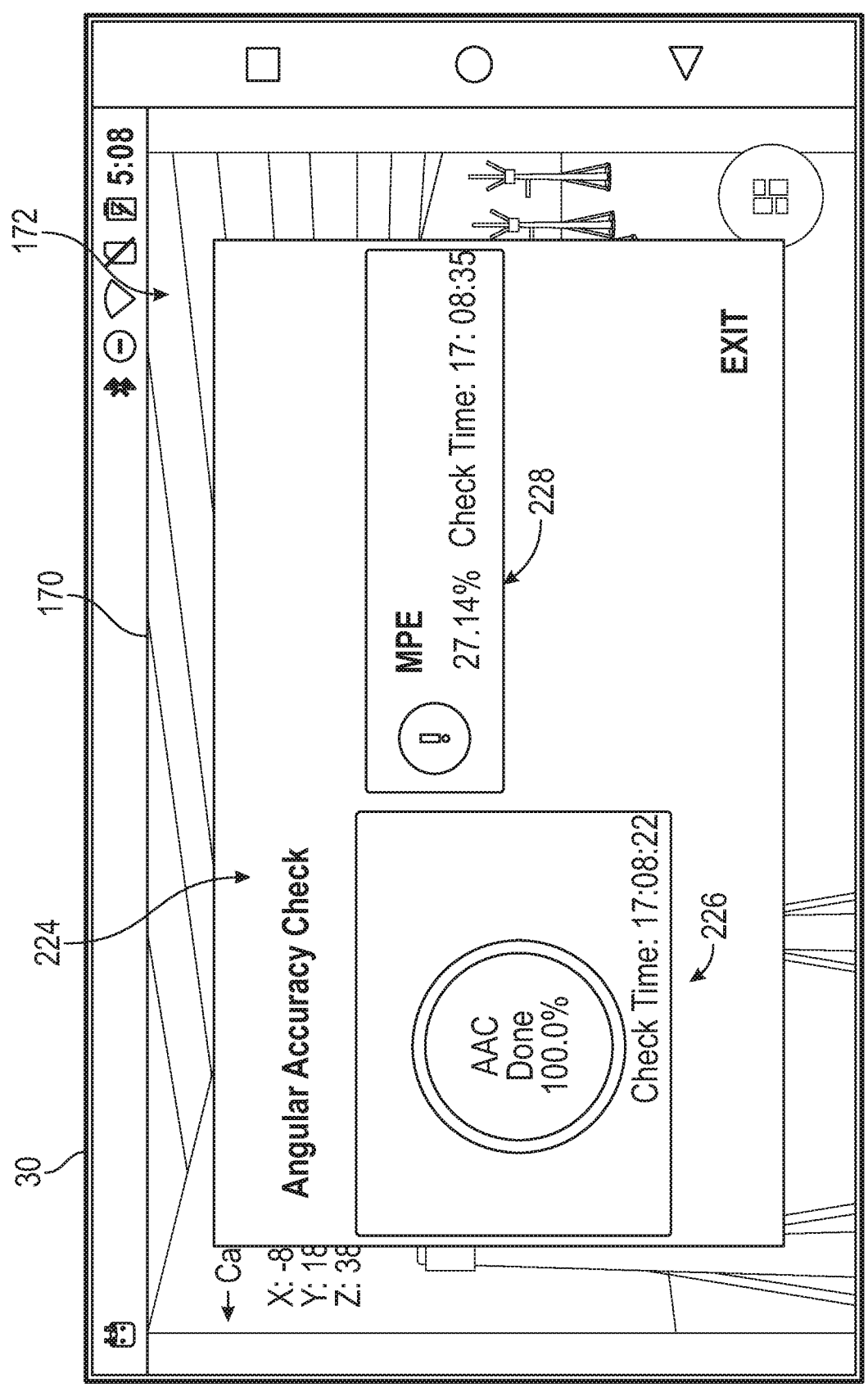

In an embodiment, once the quick compensation is performed, the angular accuracy may be determined again and compared to the MPE. When the MPE is within predetermined limits as shown in FIG. 17, the user may then proceed to use the laser tracker device with confidence in the measurements. If the MPE is still exceeded, the user may elect to perform a more extensive compensation, such as the pointing compensation for example.

Figure 18:
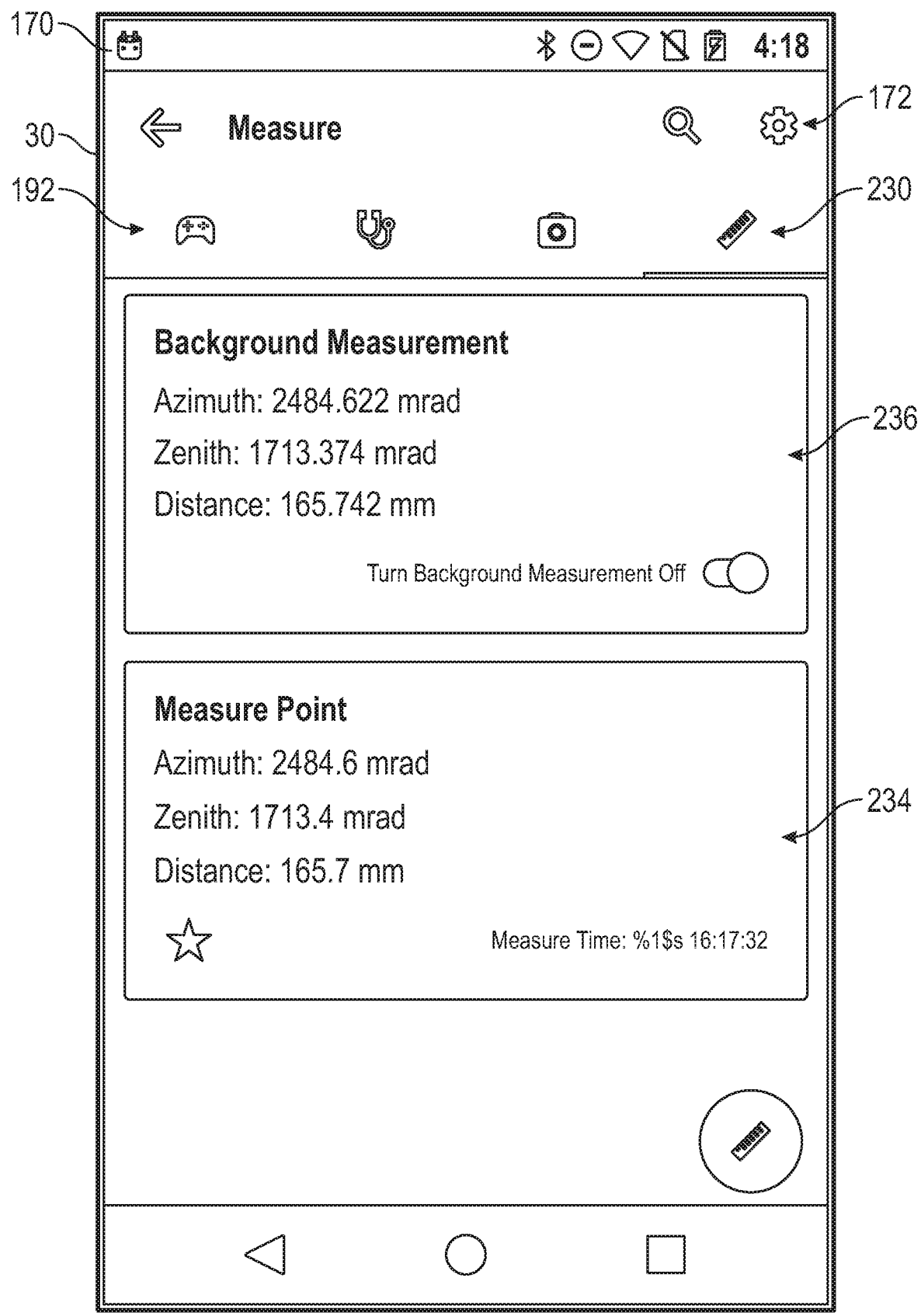

With the accuracy within the desired limits, the user may select the "back arrow" element 232 (FIG. 16) to return to the GUI 172 of FIG. 8. By selecting a measure control element 230 in the row of graphical elements 192, the GUI 172 of FIG. 18 is displayed. This activates a measurement module 197 of engine 184. This module 197 causes the laser tracker device to emit the laser light 52. If the laser tracker device is locked onto a retroreflective device when the measure control element 230 is selected, the laser tracker device determines the distance to the retroreflective target and the values of the angular encoders. The resulting coordinate values for the retroreflective target are displayed in the Measure Point element 234. If the laser tracker device is not locked onto a retroreflective device when the measure control element 230 is selected, results will only be displayed in the Background measurement element 236. When background measurements are displayed (e.g. not locked on), only the azimuth and zenith directions of the laser light 52 (as measured by the angular encoders) will be displayed without any distance measurement.

It should be appreciated that while embodiments herein refer to the mobile computing device 30 connecting to the laser tracker device 22A through the computer network 26, this is for exemplary purposes and the claims should not be so limited. In other embodiments, the mobile computing device 30 may directly connect with the laser tracker device 22A, such as using the Bluetooth communications circuit 180, the NFC communications circuit 178 or the WiFi communications circuit 178 for example. In still further embodiments, the mobile computing device 30 may be connected to the laser tracker device 22A by a wired connection, such as a Universal Serial Bus (USB) connection or an Ethernet connection for example. In other embodiments, the control element may directly connect to the laser tracker device 22A without going through a network but using a local IP address, usually in combination with an Ethernet cross-over cable.

In some embodiments, the control of the laser tracker device with the mobile computing device utilizes functionality addressed in the native language of the mobile computing device. Thus, the mobile computing device becomes an extension of the laser tracker device since the mobile computing device is natively and directly controlling the functions of the laser tracker device. This is different from prior art remote controls that utilized remote desktop protocols to access the laser tracker device. In other words, the prior art remote devices controlled the laser tracker with the laser tracker control functions rather than with the remote device itself Further, while embodiments herein refer to computer network 26 in terms of a local area network, this is for exemplary purposes and the claims should not be so limited. Rather, embodiments are capable of being implemented in conjunction with any other type of computing environment now known or later developed. For example, the computer network may be in the form of a cloud computing network. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

The characteristics of cloud based computing include: on-demand self-service; broad network access; resource pooling; rapid elasticity and measured service. Service models include: software-as-a-service; platform-as-a-service; and infrastructure-as-a-service. Deployment models include: private cloud; community cloud; public cloud; and hybrid cloud.

A cloud computing environment comprises one or more cloud computing nodes with which local computing devices used by cloud consumers, such as, for example, personal digital assistant (PDA) or cellular telephone, desktop computer, or laptop computer may communicate. Nodes may communicate with one another. They may be grouped (not shown) physically or virtually, in one or more networks, such as Private, Community, Public, or Hybrid clouds as described hereinabove, or a combination thereof. This allows cloud computing environment to offer infrastructure, platforms and/or software as services for which a cloud consumer does not need to maintain resources on a local computing device. It is understood that the types of computing devices are intended to be illustrative only and that computing nodes and cloud computing environment can communicate with any type of computerized device over any type of network and/or network addressable connection (e.g., using a web browser).

In an embodiment, the engine 184 is partially or wholly arranged in the cloud computing environment. For example, the engine 184 may be stored and executed on one or more nodes (e.g. node 28) and accessed by the mobile computing device 30, such as via a web browser for example. In other embodiments, one or more of the modules 186, 190, 191, 193, 195, 197 are stored or executed on a node in the cloud computing environment.

The cloud computing environment may be defined in terms of a set of abstract layers. These layers may include: a hardware layer; a virtualization layer; and a workloads layer. The engine 183 or the one or more of the modules 186, 190, 191, 193, 195, 197 may be stored or executed in the workloads layer.

In accordance with one or more embodiments, a laser tracker system is provided. The laser tracker system includes at least one laser tracker device coupled for communication to a computer network, the at least one laser tracker device having a structure rotatable about a first axis and a second axis, a first light source that launches a first light beam from the structure, a distance meter, a first angular encoder that measures a first angle of rotation about the first axis, a second angular encoder that measures a second angle of rotation about the second axis, and one or more first processors, the at least one laser tracker device further including at least one camera positioned and oriented to acquire an image in the direction of the first light beam. The laser tracker system further includes a mobile computing device coupled for communication to the computer network, the mobile computing device including one or more second processors that are responsive to executable computer instructions. The executable computer instructions when executed on the one or more second processors perform a method comprising: identifying the at least one laser tracker device on the computer network, the at least one laser tracker device including a first laser tracker device; selecting the first laser tracker device; connecting to the first laser tracker device to transmit signals therebetween via the computer network in response to a first input from a user; and causing the first laser tracker device to perform one or more control functions in response to one or more second inputs from the user, wherein at least one of the one or more control functions includes selecting with the mobile computing device a retroreflective target and locking the first light beam on the retroreflective target.

In one or more embodiments, the laser tracker system includes executable computer instructions that further comprise displaying on a display of the mobile computing device the image acquired from the at least one camera. In one or more embodiments, the laser tracker system includes executable computer instructions further comprise: causing the first laser tracker device to emit a second light from a second light source; and determining a location in the image of the retroreflective target based at least in part on a reflection of the second light.

In one or more embodiments, the laser tracker system includes executable computer instructions for determining of the location in the image of the retroreflective target that includes: identifying a spot of light having an first illumination level of at least a predetermined level in response to emitting the second light; and determining a difference between a maximum illumination level and a minimum illumination level when the second light is not being emitted is at least a predetermined amount. In one or more embodiments, the laser tracker system includes executable computer instructions that further comprise changing a color of the spot of light in the image based on determining the spot of light is the retroreflective target. In one or more embodiments, the laser tracker system includes executable computer instructions that further comprise positioning a graphical indicator on or about the spot of light in the image based on determining the spot of light is the retroreflective target. In one or more embodiments, the laser tracker system includes executable computer instructions that further comprise positioning a graphical indicator on or about the spot of light in the image based on determining the spot of light is not generated by a retroreflective target.

In one or more embodiments, the laser tracker system includes executable computer instructions that further comprise selecting the retroreflective target in response to the user placing their finger on the display substantially near the spot of light in the image for a predetermined amount of time. In one or more embodiments, the laser tracker system includes executable computer instructions that further comprise causing the first laser tracker device to rotate the structure about the first axis and the second axis to a position that directs the first light beam towards the retroreflective target in response to selecting the retroreflective device. In one or more embodiments, the first laser tracker device is configured to perform a search to lock onto the retroreflective target based on the structure being rotated to the position.

In one or more embodiments, the laser tracker system includes executable computer instructions that further comprise causing the first laser tracker device to rotate the structure about the first axis in response to an input from the user. In one or more embodiments, the input from the user includes the user touching the display with a finger and moving the finger across the display in a direction substantially perpendicular to the first axis. In one or more embodiments, the direction of rotation of the structure corresponds to a direction of movement of the finger relative to the display.

In one or more embodiments, the laser tracker system includes executable computer instructions that further comprise causing the first laser tracker device to stop the rotation of the structure in response to the user touching the display after moving the finger across the display. In one or more embodiments, the laser tracker system includes executable computer instructions that further comprise rotating the structure about the second axis in response to the user touching the display with the finger and moving the finger across the display in a direction substantially perpendicular to the second axis.

In one or more embodiments, the laser tracker system includes at least one accelerometer operable to measure a movement about a third axis, the third axis being parallel to one side of the mobile computing device. In one or more embodiments, the input from the user includes tilting the mobile computing device relative to the third axis.

In one or more embodiments, the laser tracker system the at least one accelerometer is operable to measure a movement about a fourth axis, the fourth axis being perpendicular to the third axis. In one or more embodiments, the laser tracker system the input from the user includes rotating the mobile computing device relative to the fourth axis. In one or more embodiments, the laser tracker system includes executable computer instructions that further comprise measuring an angular accuracy the first laser tracker device.

In one or more embodiments, the laser tracker system includes executable computer instructions further comprise: causing the first laser tracker device to perform a front sight measurement and then a back-sight measurement; determining a resulting error parameter; comparing the resulting error parameter to a permissible error parameter; and causing the first laser tracker device to perform a compensation.

In an embodiment, the laser tracker system includes a combination of one or more of the previously described embodiments.

In one or more embodiments, a method is provided. The method includes: providing at least one laser tracker device coupled for communication to a computer network, the at least one laser tracker device having a structure rotatable about a first axis and a second axis, a first light source that launches a first light beam from the structure, a distance meter, a first angular encoder that measures a first angle of rotation about the first axis, a second angular encoder that measures a second angle of rotation about the second axis, and one or more first processor, the at least one laser tracker device further including at least one camera positioned and oriented to acquire an image in a direction of the first light beam; providing a mobile computing device coupled for communication to the computer network, the mobile computing device; identifying with the mobile computing device the at least one laser tracker device on the computer network, the at least one laser tracker device including a first laser tracker device; connecting the mobile computing device to the first laser tracker device to transmit signals therebetween via the computer network in response to a first input from a user; and performing one or more control functions on the first laser tracker device in response to one or more second inputs from the user, wherein at least one of the one or more control functions includes selecting with the mobile computing device a retroreflective target and locking the first light beam on the retroreflective target.

In one or more embodiments, the method further comprises displaying on a display of the mobile computing device the image acquired from the at least one camera. In one or more embodiments, the method further comprises: emitting a second light from a second light source from the first laser tracker device; and determining a location in the image of the retroreflective target based at least in part on a reflection of the second light. In one or more embodiments, the determining of the location in the image of the retroreflective target includes: identifying in the image a spot of light having an first illumination level of at least a predetermined level in response to emitting the second light; and determining a difference between a maximum illumination level and a minimum illumination level when the second light is not being emitted is at least a predetermined amount.

In one or more embodiments, the method further comprises changing a color of the spot of light in the image based on determining the spot of light is the retroreflective target. In one or more embodiments, the method further comprises positioning a graphical indicator on or about the spot of light in the image based on determining the spot of light is the retroreflective target. In one or more embodiments, the method further comprises positioning a graphical indicator on or about the spot of light in the image based on the determining the spot of light is not generated by the retroreflective target.

In one or more embodiments, the method further comprises selecting the retroreflective target in response to the user placing their finger on the display substantially near the spot of light in the image for a predetermined amount of time. In one or more embodiments, the method further comprises rotating the structure of the first laser tracker device about the first axis and the second axis to a position that directs the first light beam towards the retroreflective device in response to selecting the retroreflective target. In one or more embodiments, the method further comprises performing with the first laser tracker device a search to lock onto the retroreflective target based on the structure being rotated to the position. In one or more embodiments, the method further comprises rotating the structure of the first laser tracker device about the first axis in response to an input from the user.

In an embodiment, the method comprises a combination of one or more of the previously described embodiments.

Technical effects and benefits of some embodiments include providing a laser tracker system interface that is controlled by a separate mobile computing device. Further technical effects and benefits is to allow a mobile computing device to automatically detect the location of one or more spots of light generated by retroreflector targets and distinguish these spots of light from spots of light that are not generated by retroreflector targets. Further technical effects and benefits is to allow for the checking of accuracy and the determination and updating of compensation parameters to improve the accuracy of the laser tracker system.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A laser tracker system comprising:
    at least one laser tracker device coupled for communication to a computer network, the at least one laser tracker device having a structure rotatable about a first axis and a second axis, a first light source that launches a first light beam from the structure, a distance meter, a first angular encoder that measures a first angle of rotation about the first axis, a second angular encoder that measures a second angle of rotation about the second axis, and one or more first processors, the at least one laser tracker device further including at least one camera positioned and oriented to acquire an image in the direction of the first light beam; and
    a mobile computing device coupled for communication to the computer network, the mobile computing device including one or more second processors that are responsive to executable computer instructions, the one or more second processors are configured to:
        identify the at least one laser tracker device on the computer network, the at least one laser tracker device including a first laser tracker device;
        select the first laser tracker device;
        connect to the first laser tracker device to transmit signals therebetween via the computer network in response to a first input from a user;
        cause the first laser tracker device to perform one or more control functions in response to one or more second inputs from the user, wherein at least one of the one or more control functions includes selecting with the mobile computing device a retroreflective target and locking the first light beam on the retroreflective target;
        display on a display of the mobile computing device the image acquired from the at least one camera;
        cause the first laser tracker device to emit a second light from a second light source:
        determine a location in the image of the retroreflective target based at least in part on a reflection of the second light;
        identify a spot of light having an first illumination level of at least a predetermined level in response to emitting the second light; and
        determine a difference between a maximum illumination level and a minimum illumination level is at least a predetermined amount when the second light is not being emitted.

2. The laser tracker system of claim 1, wherein the one or more second processors are further configured to change a color of the spot of light in the image based on determining the spot of light is the retroreflective target.

3. The laser tracker system of claim 1, wherein the one or more second processors are further configured to position a graphical indicator on or about the spot of light in the image based on determining the spot of light is the retroreflective target.

4. The laser tracker system of claim 1, wherein the one or more second processors are further configured to position a graphical indicator on or about the spot of light in the image based on determining the spot of light is not generated by a retroreflective target.

5. The laser tracker system of claim 1, wherein the one or more second processors are further configured to select the retroreflective target in response to the user placing their finger on the display substantially near the spot of light in the image for a predetermined amount of time.

6. The laser tracker system of claim 5, wherein the one or more second processors are further configured to cause the first laser tracker device to rotate the structure about the first axis and the second axis to a position that directs the first light beam towards the retroreflective target in response to selecting the retroreflective device.

7. The laser tracker system of claim 6, wherein the first laser tracker device is configured to perform a search to lock onto the retroreflective target based on the structure being rotated to the position.

8. The laser tracker system of claim 1, wherein the one or more second processors are further configured to cause the first laser tracker device to rotate the structure about the first axis in response to an input from the user.

9. The laser tracker system of claim 8, wherein for the input from the user, the one or more second processors are further configured to respond to the user touching the display with a finger and moving the finger across the display in a direction substantially perpendicular to the first axis.

10. The laser tracker system of claim 9, wherein the direction of rotation of the structure corresponds to a direction of movement of the finger relative to the display.

11. The laser tracker system of claim 9, wherein the one or more second processors are further configured to cause the first laser tracker device to stop the rotation of the structure in response to the user touching the display after moving the finger across the display.

12. The laser tracker system of claim 9, wherein the one or more second processors are further configured to rotate the structure about the second axis in response to the user touching the display with the finger and moving the finger across the display in a direction substantially perpendicular to the second axis.

13. The laser tracker system of claim 8, wherein:
the first laser tracker device includes at least one accelerometer operable to measure a movement about a third axis, the third axis being parallel to one side of the mobile computing device; and
for the input from the user, the one or more second processors are further configured to tilt the mobile computing device relative to the third axis.

14. The laser tracker system of claim 13, wherein:
the at least one accelerometer is operable to measure a movement about a fourth axis, the fourth axis being perpendicular to the third axis; and
for the input from the user, the one or more second processors are further configured to rotate the mobile computing device relative to the fourth axis.

15. The laser tracker system of claim 1, wherein the one or more second processors are further configured to measure an angular accuracy the first laser tracker device.

16. The laser tracker system of claim 15, wherein the one or more second processors are further configured to:
cause the first laser tracker device to perform a front sight measurement and then a back-sight measurement;
determine a resulting error parameter;
compare the resulting error parameter to a permissible error parameter; and
cause the first laser tracker device to perform a compensation.

* * * * *